United States Patent
Ishii et al.

(10) Patent No.: US 7,287,810 B2
(45) Date of Patent: Oct. 30, 2007

(54) CONSTRUCTION MACHINE

(75) Inventors: Hajime Ishii, Youkaichi (JP); Shogo Kimura, Ritto (JP); Shigeru Hirasawa, Ritto (JP); Tomoyuki Tanaka, Moriyama (JP); Hiroshi Tabeta, Shiga (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 93 days.

(21) Appl. No.: 10/550,730

(22) PCT Filed: Oct. 5, 2004

(86) PCT No.: PCT/JP2004/015006

§ 371 (c)(1),
(2), (4) Date: Sep. 26, 2005

(87) PCT Pub. No.: WO2005/035341

PCT Pub. Date: Apr. 21, 2005

(65) Prior Publication Data

US 2006/0266573 A1    Nov. 30, 2006

(30) Foreign Application Priority Data

Oct. 14, 2003  (JP) .............................. 2003-353998
Oct. 17, 2003  (JP) .............................. 2003-358218

(51) Int. Cl.
*B62D 33/067*  (2006.01)
*B62D 33/10*   (2006.01)

(52) U.S. Cl. ..................... 296/190.05; 296/190.07; 180/89.14

(58) Field of Classification Search .......... 296/190.05, 296/190.06, 190.07; 180/89.14
See application file for complete search history.

(56) References Cited

U.S. PATENT DOCUMENTS 5,547,244 A * 8/1996 Lee ......................... 296/102
6,709,046 B2 * 3/2004 Okazawa et al. ....... 296/190.07

FOREIGN PATENT DOCUMENTS

| DE | 19723926 | * 12/1997 |
| JP | 6-136787 |   5/1994 |
| JP | 08-188181 |  7/1996 |
| JP | 2000-72048 |  3/2000 |
| JP | 2003-221841 A | 8/2003 |

* cited by examiner

*Primary Examiner*—Dennis H. Pedder
(74) *Attorney, Agent, or Firm*—Mattingly, Stanger, Malur & Brundidge, PC

(57) ABSTRACT

Right and left floor panel support mechanisms (40) and (46) are provided on a revolving frame (5) to support a front end of a floor panel (21) pivotally for permitting tilt-up and tilt-down of the floor panel (21). A tilting mechanism (54) is provided between the revolving frame (5) and the floor panel (21) for tilting the floor panel (21) together with a canopy (31). Through a plural number of vibration insulators (20), a floor panel mount plate (19) is mounted on a support member (12) which is located in a rear side portion of the revolving frame (5). A housing mount plate (24) of the floor panel (21) and a base plate (37) of the canopy (31) are detachably fixed to the floor panel mount plate (19) by the use of fastening bolts (39). After removing the fastening bolts (39), the floor panel (21) and canopy (31) can be tilted together without necessitating to disassemble the vibration insulators (20).

10 Claims, 27 Drawing Sheets

CONSTRUCTION MACHINE

TECHNICAL FIELD

This invention relates to construction machines such as, for example, hydraulic excavators and hydraulic cranes, and more particularly to a construction machine with a floor panel which is tiltable relative to a frame of the machine.

BACKGROUND ART

Generally, as a construction machine, a hydraulic excavator is constituted by an automotive lower structure, an upper revolving structure which is rotatably mounted on the automotive lower structure, and a working mechanism rotatably mounted on a front side section of the upper revolving structure.

Normally, the upper revolving structure on a hydraulic excavator of this sort is largely constituted by a revolving frame, an engine which is mounted on a rear side section of the revolving frame, a counterweight which is attached to rear end of the revolving frame at a position on the rear side of the engine, a floor panel which is provided on the revolving frame at a position on the front side of the engine, an operator's seat which is provided on the floor panel for an operator, and a housing or cover structure like a canopy or a cab which covers the upper side of the operator's seat.

Among hydraulic excavators, there are small-size hydraulic excavators, the so-called "mini shovels", which are suited particularly for use on narrow working sites. In the case of small-size hydraulic excavators, it is difficult to secure a space for installation of a control valve, a swing motor or other equipments. Therefore, it is often the case to accommodate these equipments under a floor panel or between a floor panel and a revolving frame.

In such a case, it has been the usual practice to provide a tilt-up mechanism in association with a floor panel thereby to lift up one end of the floor panel away from the revolving frame. For example, at the time of maintenance and service, the floor panel is tilted up to allow easy access to control valve, swing motor or other equipments which are located under the floor panel.

More specifically, a floor panel support mechanism is provided between fore ends of a revolving frame and a floor panel to support the floor panel, permitting the floor panel to turn up and down in forward and rearward directions together with an operator's seat and a housing, about a supporting point which is provided at the front end of the floor panel. Further, it has been known to provide gas dampers of a tilting mechanism under the floor panel thereby to tilt up and down the floor panel in upward or forward direction, turning about a supporting point on the floor support mechanism (e.g., as disclosed in Japanese Patent Laid-Open No. 2000-72048).

In the case of hydraulic excavators in general, for the purpose of improving working environment of operator, a plural number of vibration insulating members are provided between a revolving frame and a floor panel to damp vibrations which would be transmitted from the revolving frame to the floor panel. These vibration insulating members are located, for example, in each one of front and rear side sections of a floor panel, connecting the floor panel to the revolving frame while resiliently supporting the floor panel from beneath (e.g., as disclosed in Japanese Patent Laid-Open No. H6-136787).

In the case of the above-mentioned hydraulic excavators of the prior art, attempts have been made to reduce discomfort and fatigue of an operator who is seated on the operator's seat, by providing a plural number of vibration insulating members between the revolving frame and the floor panel, for preventing transmission of vibrations from the revolving frame to the floor panel during a ground excavating operation or in a vehicular traveling operation.

However, in the case of a hydraulic excavator with such vibration insulating members, it is necessary to detach vibration insulating members in a rear side section from the revolving frame or from the floor panel to disconnect the floor panel from the revolving frame before lifting up the rear side of the floor panel and tilting up forward direction together with an operator's seat and a housing.

The vibration insulating members of this sort are constituted, for example, by large number of parts such as a resilient rubber bush, a sleeve which plays a role of positioning the rubber bush, a washer and a bolt for anchoring the respective parts. Therefore, at the time of dismantling vibration insulating members, it becomes necessary to disassemble the large number of parts. This means that it takes a great deal of time and labor just for dismantling the vibration insulating members, making a tilt-up operation of the floor panel troublesome and time consuming.

Besides, as described above, at the time of lifting a rear side of the floor panel to tilt up the whole floor panel in forward direction together with an operator's seat and a housing, the center of gravity is shifted by the tilt-up operation, giving rise to a problems as described below.

Namely, when the tilt-up angle of the floor panel is still small, loads of the floor panel, operator's seat and housing act in rearward direction, tending to push down the rear side of the floor panel. However, as the tilt-up angle of the floor panel increases, the center of gravity is shifted to a position forward of a supporting point on the floor panel support mechanism, and as a result, the loads of the floor panel, operator's seat and housing act to become a reversal force which tends to push up the rear side of the floor panel.

As a consequence, in the case of a tilting mechanism using gas dampers or the like, as the tilt-up angle of the floor panel increases, loads of the floor panel, operator's seat and housing inversely act as a pulling force, imposing a great load on gas dampers to such a degree as to cause premature damages to the gas dampers, deteriorating their durability and the service life.

DISCLOSURE OF THE INVENTION

In view of the above-discussed problems with the prior art, it is an object of the present invention to provide a construction machine which is so arranged as to make a rear side portion of a floor panel disconnectable from a frame in a simple and facilitated manner, permitting to tilt up the floor panel easily at the time of maintenance and service of equipments.

It is another object of the present invention to provide a construction machine which is so arranged to prevent overloading of a tilting mechanism when a floor panel is tilted up in a forward direction, improving the durability and prolonging the service life of the tilting mechanism while ensuring stabilized tilt-up actions of the floor panel.

(1) In order to solve the above-discussed problems, the present invention is applied to a construction machine of the sort which has a frame supporting a working mechanism on the front side thereof, a floor panel provided on the frame and pivotally supported at a fore end thereof through a supporting point, and an operator's seat provided on the floor panel and to be taken by an operator.

The construction machine according to the present invention is characterized by the provision of: a support member located in a rear side of the frame to support a rear side portion of the floor panel; a floor panel mount plate located on top of the support member for mounting thereon a rear side portion of the floor panel; vibration insulator members interposed between the floor panel mount plate and the support member to dampen vibrations to be transmitted to the floor panel mount plate from the frame through the support member; and fastening members detachably mounted a rear side portion of the floor panel to the floor panel mount plate.

With the arrangements just described, when the construction machine is put in operation, vibrations to be transmitted to the floor panel are dampened by vibration insulators which are interposed between the support member and the floor panel mount plate to which a rear side of the floor panel is fixed by the use of fastening members. As vibrations of the floor panel are dampened in this manner, the working environment and comfortableness on the machine are improved to lessen discomfort and fatigue on the part of an operator.

Further, when the floor panel is tilted up together with the operator's seat at the time of carrying out a maintenance job of the construction machine, the rear side portion of the floor panel can be easily disconnected from the floor panel mount plate simply removing fastening members which fasten the rear side of the floor panel to the floor panel mount plate. Upon removing the fastening members, the floor panel can be turned about a supporting point at its front end to lift up its rear side portion, that is, the floor panel is tilted up in a forward or upward direction together with the operator's seat.

As a consequence, there is no need for disassembling the vibration insulators at the time of tilting the floor panel. That is to say, a tilting operation of the floor panel can be completed in a short time and in a facilitated manner. Therefore, maintenance and service work for control valve, swing motor, engine or other equipments under the floor panel can be carried out in an efficient and facilitated manner to lessen the burden on the part of a service man.

(2) According to the present invention, the construction machine further comprising a housing on the floor panel, the housing being arranged to cover the operator's seat at least at an overhead position and provided with a base plate in a rear side portion to be attached to a rear side of the floor panel. The base plate at the rear side of the housing which is located over the operator's seat, is fixed to a rear side portion of the floor panel, so that the housing can be tilted together with the floor panel upon removing fastening members.

(3) According to the present invention, the support member includes a support base located over the frame to support the floor panel mount plate thereon, and a plural number of support posts each fixed to the frame to support the support base from beneath; each one of the vibration insulators being composed of upper and lower resilient members adapted to hold the support base from upper and lower sides, and bolts adapted to connect the floor panel mount plate to the support base through the resilient members.

With the arrangements just described, for example, even if vibrations are transmitted from the frame to the support member, such vibrations are dampened by resilient deformation of the upper and lower sides of the resilient members which are on the upper and lower sides of the support base on the support member. Therefore, the vibrations which are transmitted from the side of the frame to the side of the floor panel through the support member can be dampened and improve the working environment and comfortableness of the operator.

(4) According to the present invention, the fastening members are adapted to fasten the base plate of the housing to the floor panel mount plate together with a rear side portion of the floor panel. Accordingly, when attaching a rear side of the floor panel to the floor panel mount plate by the use of fastening members, the base plate of the housing can be fastened to the floor panel mount plate together with the floor panel. Therefore, the base plate of the housing can be mounted on the floor panel in a very simplified manner. Besides, the base plate of the housing can be firmly attached to the floor panel.

(5) According to the present invention, the fastening members are each in the form of a bolt with a male screw, and the floor panel mount plate is provided with vibration insulator mount portions adapted to mount the vibration insulators from beneath, and female screw provided at different positions from the vibration insulator mount portions and the bolt being threaded into the female screw from above the floor panel mount plate.

Therefore, the floor panel mount plate can be provided on the support member by attaching the vibration insulators to the vibration insulator mount portion from beneath. In this state, the vibration insulators can be concealed under the floor panel mount plate for protecting the vibration insulators and at the same time for a better look. Besides, the bolts which are employed as fastening members are threaded into female screws on the floor panel mount plate from above, making it possible to drive the bolts into or out of the female screws easily from outside.

(6) On the other hand, according to the present invention, the construction machine further comprises a tilting stopper between the frame and the floor panel to restrict a tilting action of the floor panel to a predetermined angular position when the floor panel is tilted along with the operator's seat.

Accordingly, when the floor panel is tilted up largely together with the operator's seat by making a turn about a supporting point at its front end, the tilting action of the floor panel can be restricted to a predetermined angular position by the tilting stopper. As a result, it becomes possible to prevent the floor panel from getting over a reversal point and falling down in forward direction, guaranteeing higher reliability of the tilt-up operation. Further, when the floor panel is in a largely tilted state, the load can be sustained by the tilting stopper, without imposing excessive load, for example, on the tilting mechanism which is at the task of tilting the floor panel, guaranteeing improved durability and prolonged service life of the tilting mechanism.

(7) According to the present invention, the construction machine further comprising a floor panel support mechanism located between fore ends of the frame and the floor panel, and connected to fore end of the floor panel through a support point in tilting up and down along with the operator's seat; and a tilting stopper provided on the floor panel support mechanism to restrict a tilting action of the floor panel to a predetermined angular position when the floor panel is tilted forward by way of using the floor panel support mechanism as a supporting point.

Accordingly, when the floor panel is tilted up largely along with the operator's seat about the supporting point on the floor panel support mechanism, the tilting action of the floor panel can be restricted to a predetermined angular position by the tilting stopper.

(8) Further, according to the present invention, the floor panel support mechanism is comprised of a first bracket provided on the side of the frame, a second bracket provided on the side of the floor panel, and a joint pin pivotally connecting the first and second brackets; and the tilting stopper is comprised of a load support portion provided on one of the first and second brackets, and an abutting portion provided on the other one of the first and second brackets and brought into abutment against the load support portion when the floor panel has been tilted to a predetermined angular position.

Accordingly, the tilting stopper which is comprised of a load support portion and an abutting portion can be assembled as part of the floor panel support mechanism. Therefore, the floor panel support mechanism and the tilting stopper can be provided in a compact form and assembly work could be completed in an efficient manner.

(9) In this instance, according to the present invention, one of the first and second brackets is comprised of a mount stand fixed on the frame or on the floor panel, and a tubular support member provided on the mount stand to have an axis thereof in a transverse direction; and the other one of the first and second brackets is comprised of a pair of mount plate adapted to support opposite end portions of the joint pin passed through the tubular support member; the load support portion of the tilting stopper being constituted by a fixed projection formed on a mount stand of one of the first and second brackets and the abutting portion being constituted by a movable projection formed at a fore end of one of the mounted plates and moved along with the floor panel toward the fixed projection when the floor panel is tilted.

Thus, the load support portion can be formed easily as a fixed projection is projected on a mount stand of the one bracket. On the other hand, the abutting portion can also be formed easily as a moving projection is located at the fore end of one bracket portion of the other bracket.

(10) According to the present invention, the construction machine further comprising a floor panel support mechanism located between fore ends of the frame and the floor panel, and connected fore end of the floor panel through a support point in tilting up and down along with the operator's seat; and a tilting mechanism provided between the frame and the floor panel on the rear side of the floor panel support mechanism, the tilting mechanism being adapted to tilt up and down the floor panel by way of a pivoting point provided on the side of the frame and a displacement point provided on the side of the floor panel and translated an arbitrary position, tilting up the floor panel in forward or upward direction to a degree commensurate with distance of translation of the displacement point.

With the arrangements just described, the floor panel is in a lowered position on the frame when the machine is in operation, with the displacement point of the tilting mechanism in the vicinity of the pivoting point. As the displacement point of the tilting mechanism is shifted to the direction away from the supporting point, the floor panel is tilted in a forward or upward direction to a degree commensurate with distance of movement of the displacement point. At this time, the movement of the displacement point can be stopped at any arbitrary position, that is to say, it is free for one to set the tilting angle of the floor panel at an arbitrary value. Therefore, at the time of maintenance and service of the engine or other equipments, the floor panel can be tilted up to a suitable degree depending upon the content of a maintenance work, and a necessary job can be completed in an efficient manner.

(11) Further, according to the present invention, the tilting mechanism comprises a guide rail assembly having a pivoting point at base end thereof pivotally supported on the side of the frame for upward and downward pivoting movements and having a fore end extended forward in a free state, a screw rod extended along and in longitudinal direction of the guide rail assembly and rotatably supported on the guide rail assembly, and a displacement member rotatably mounted on the side of the floor panel and held in threaded engagement with the screw rod as a displacement point for movement in forward and rearward directions along the guide rail assembly.

With the arrangements just described, by rotating the screw rod of the guide rail on the side of the frame, the displacement member which is in threaded engagement with the screw rod is translated in a forward direction on and along the guide rail assembly. At this time, the guide rail assembly functions as a post for supporting the floor panel in a tilted state relative to the frame.

Then, to a degree commensurate with a distance of movement of the displacement member which is attached to the side of the floor panel, the floor panel is tilted up in a forward direction, lifting up the rear side of the floor panel by letting about a supporting point at the fore end. When the floor panel is in a tilted-up state, a wide working space free of gas dampers is opened between the base frame and the floor panel.

BEST MODE FOR CARRYING OUT THE INVENTION

Figure 1:
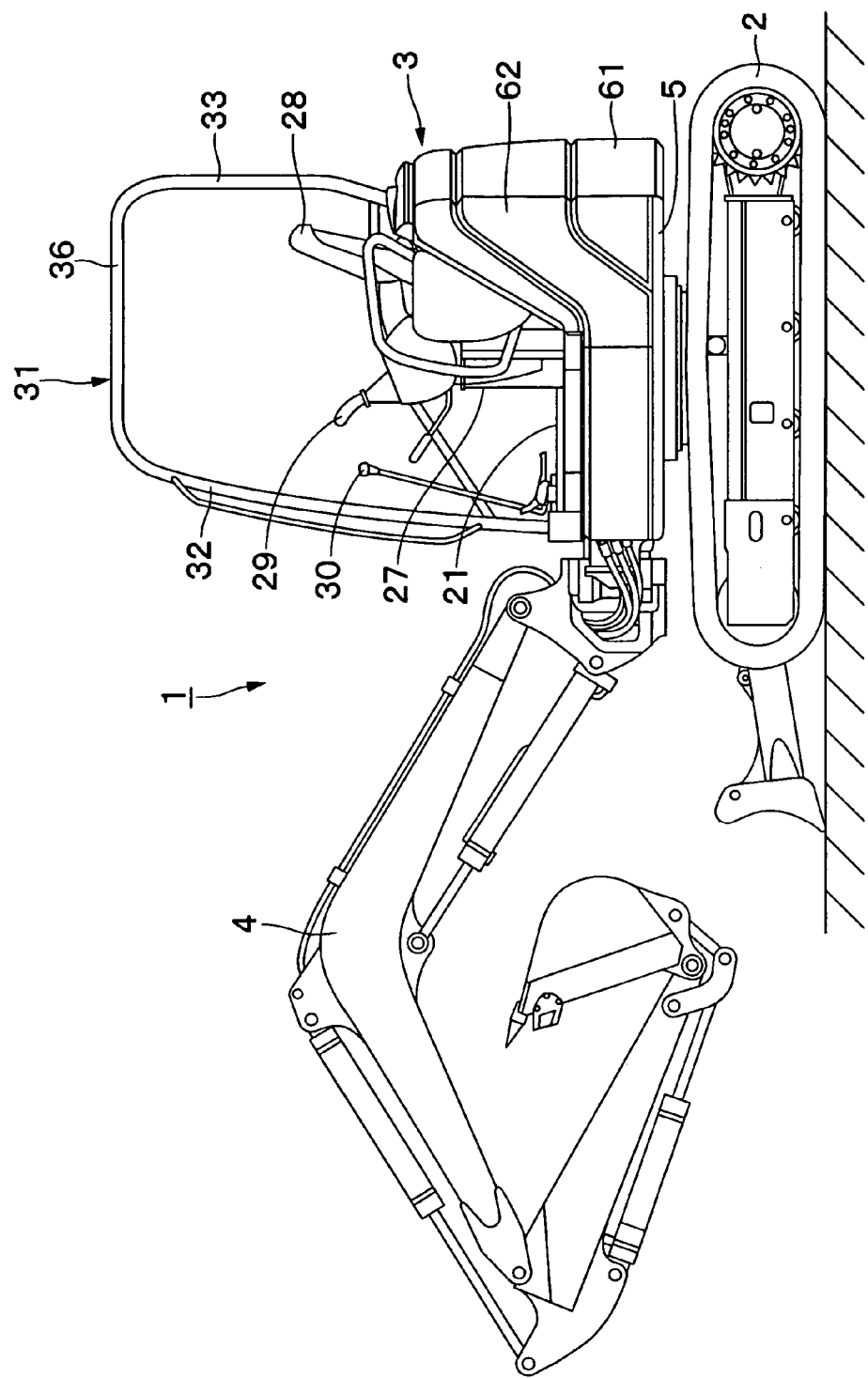
FIG. 1 is a front view of a canopy type hydraulic excavator to which a first embodiment of the invention is applied.
Figure 2:
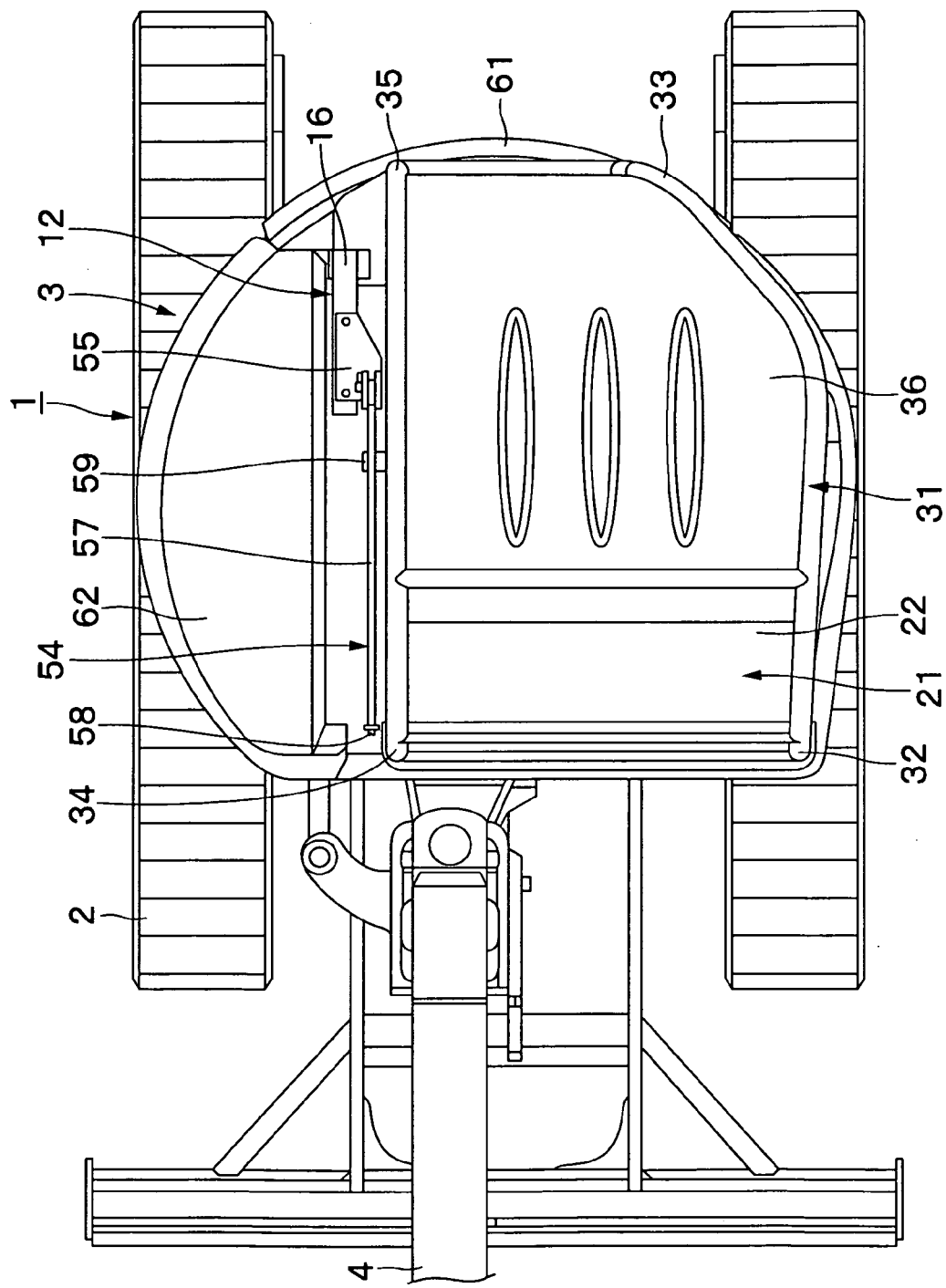
FIG. 2 is a plan view, taken from above, of the hydraulic excavator of FIG. 1.

Hereafter, with reference to the accompanying drawings, the present invention is described more particularly by way of its preferred embodiments which are applied to a small type hydraulic excavator, i.e., a typical construction machine.

Shown in FIGS. 1 through 23 is a first embodiment of the construction machine according to the present invention.

In the drawings, indicated at 1 is a canopy type hydraulic excavator as a construction machine. The hydraulic excavator 1 is constituted by a crawler type automotive lower structure 2, and an upper revolving structure 3 which is rotatably mounted on the lower structure 2. Rotatably provided on the front side of the upper revolving structure 3 is a swing type working machine 4, for example, for ground excavating operations.

When seen from above, the upper revolving structure 3 is formed substantially in a circular shape (see FIG. 2), so that it can be turned within the width of the lower structure 2. Further, as shown in FIGS. 1 through 6, the upper revolving structure 3 is largely constituted by revolving frame 5, engine 6, support member 12, floor panel mount plate 19, vibration insulators 20, floor panel 21, operator's seat 28, canopy 31, fastening bolts 39, floor panel support mechanisms 40 and 46, and tilting mechanism 54, which will be described hereinafter.

Figure 3:
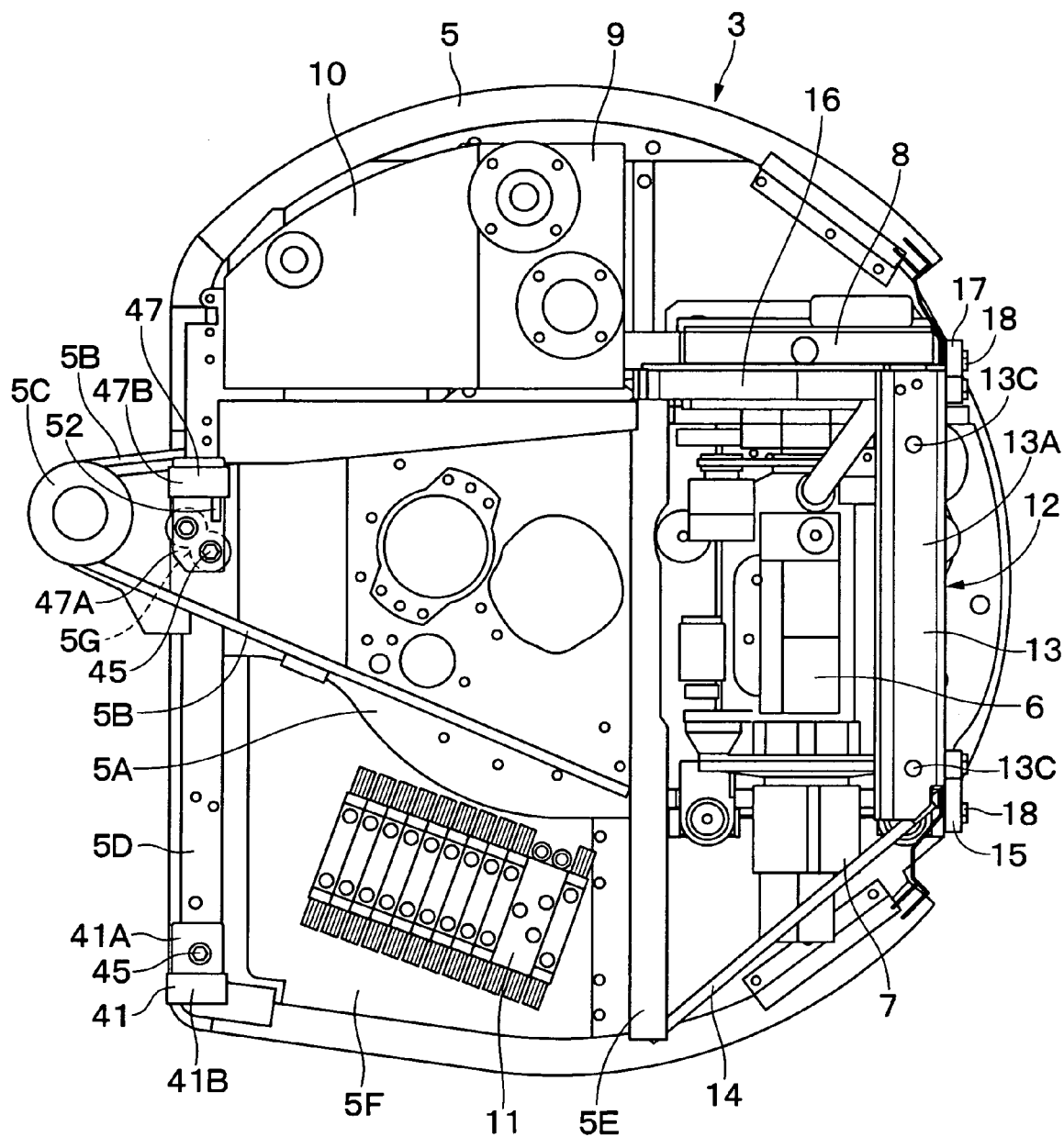
FIG. 3 is a plan view of a revolving frame on an upper revolving structure, with a floor panel and exterior cover removed therefrom FIG. 2.

Indicated at 5 is a revolving frame, which is a base frame of the upper revolving structure 3. As shown in FIG. 3, the revolving frame 5 is largely constituted by a flat bottom plate 5A which is located at a transversely intermediate position to extend in forward and rearward directions, a pair of vertical plates 5B which are erected on the upper side of the bottom plate 5A in laterally spaced positions, a support bracket 5C which is provided on fore ends of the vertical plates 5B to support the working mechanism 4, a front beam 5D which is extended in the transverse direction at the front end of the revolving frame, an intermediate beam 5E which is extended in the transverse direction on the rear side of the vertical plates 5B, and an undercover 5F which is provided between the front and intermediate beams 5D and 5E. Further, provided in the vicinity of the back side of the support bracket 5C is a mount seat 5G to which a bracket 47 on the side of the frame of a right floor panel support mechanism 46 is attached which will be described hereinafter.

Denoted at 6 is an engine (see FIGS. 3 and 4) which is mounted on a rear side of the revolving frame 5. This engine 6 is mounted transversely to extend in rightward and leftward directions. In this instance, the engine 6 is located to get underneath a partition panel 23 of a floor panel 21, which will be described hereinafter. Located on the left side of the engine 6 is a hydraulic pump 7 which is driven by the engine 6, and located on the right side of the engine 6 is a heat exchanger 8 such as radiator and oil cooler.

Indicated at 9 is an operating oil tank which is located in a right side section of the revolving frame 5 on the front side of the heat exchanger 8, and at 10 is a fuel tank which is located on the front side of the operating oil tank 9. Designated at 11 is a control valve which is provided on the undercover 5F of the revolving frame 5. This control valve 11 is connected with the hydraulic pump 7 and the operating oil tank 9. Further, located centrally of the revolving frame 5 are a swing motor which turns the upper revolving structure 3, and a center joint (both not shown) which supplies pressure oil to the side of the lower structure 2 while permitting revolving motions. Further, a battery (not shown) is located above the fuel tank 10.

Figure 4:
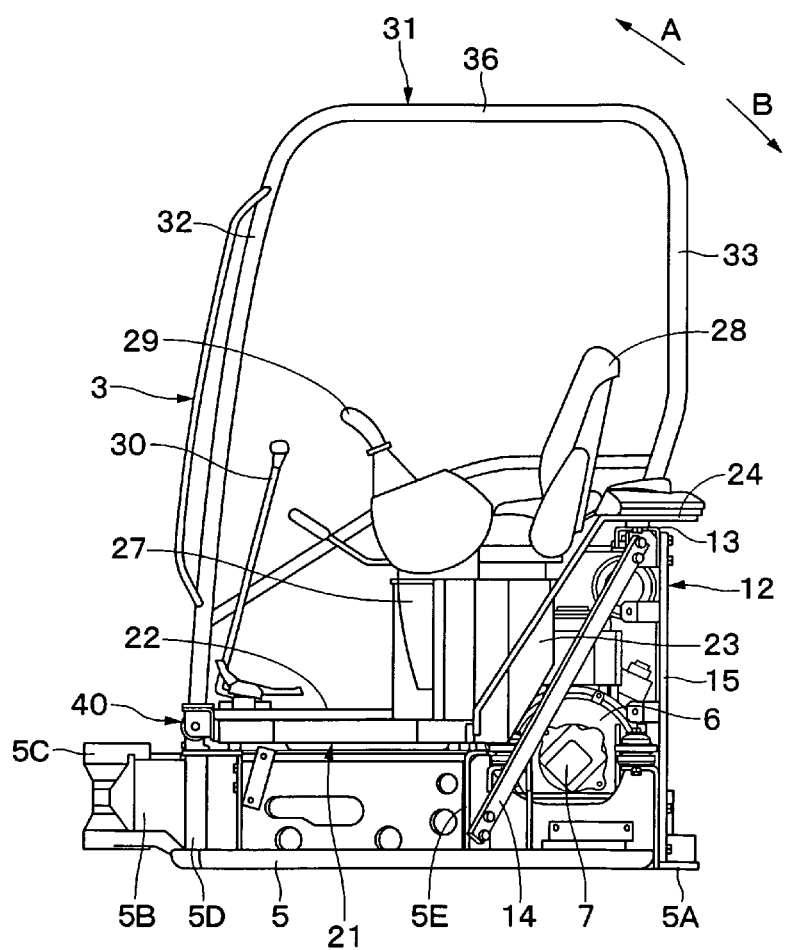
FIG. 4 is a front view of the upper revolving structure, with the exterior cover removed therefrom.

Indicated at 12 is a support member which is located at the rear side of the revolving frame 5. This support member 12 constitutes part of the revolving frame 5, and, as shown in FIGS. 3 and 4, is located astride of the engine 6. Further, the support member 12 is largely constituted by a support base 13, and support posts 14 to 17, which will be described hereinafter.

Figure 8:
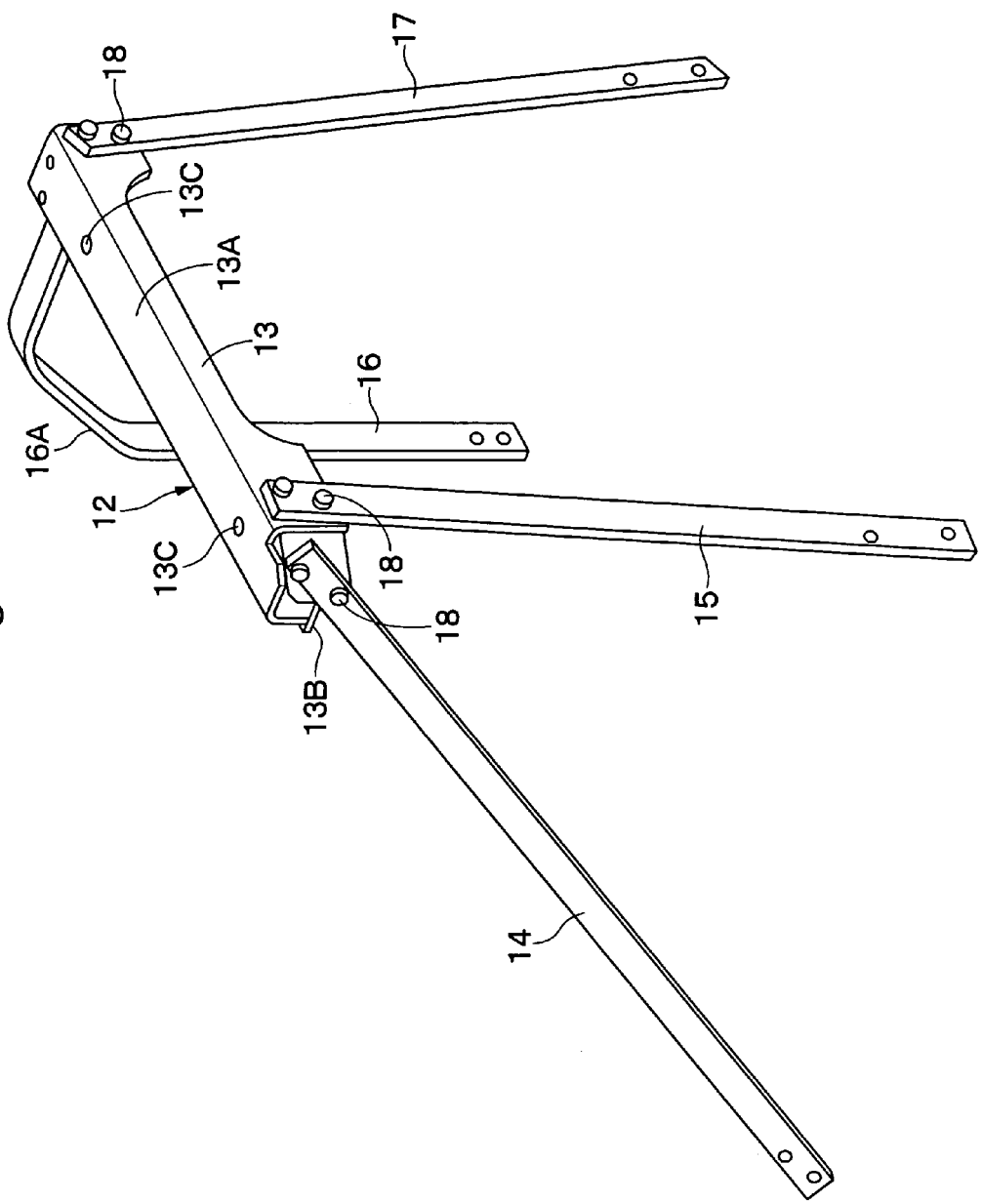
FIG. 8 is a perspective view of a support member alone.

Indicated at 13 is a support base which constitutes an upper part of the support member 12. As shown in FIGS. 3 and 4, the support base 13 is extended in the transverse direction over the engine 6. Further, as shown in FIG. 8, the support base 13 is formed in the shape of a transversely extending hollow square tube by the use of a base plate 13A which is bent in U-shape, and a lower plate 13B which is securely fixed to the base plate 13A in such a way as to close the lower side of the base plate 13A.

Figure 11:
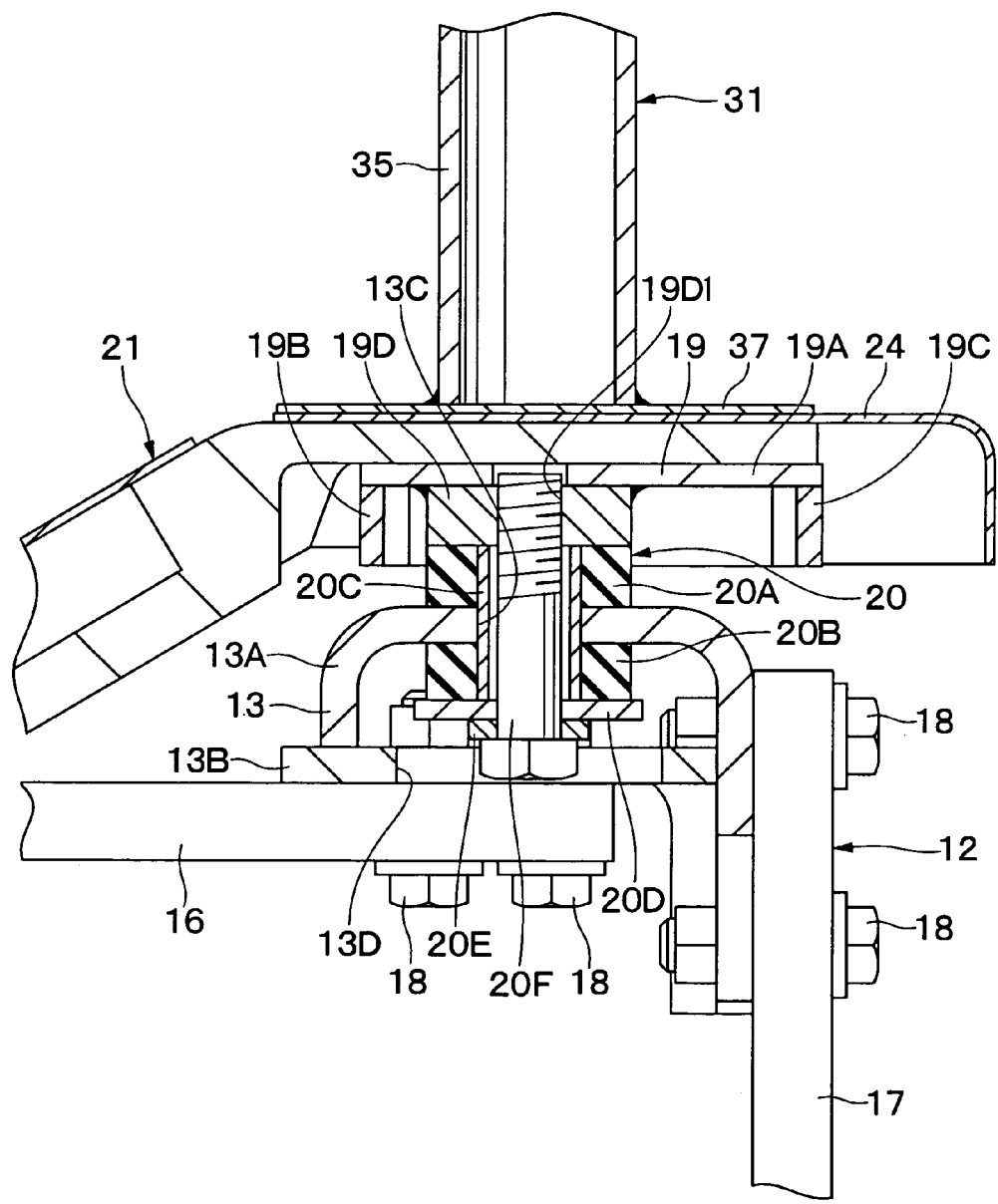
FIG. 11 is a vertical sectional view of the support member, vibration insulators, floor panel mount plate and housing mount plate of the floor panel, taken in the direction of arrows XI-XI in FIG. 9.

Further, a couple of vibration insulator mount holes 13C are bored in the base plate 13A in transversely spaced positions for mounting vibration insulators 20 which are described hereinafter. On the other hand, a couple of loose openings 13D (one of which is shown in FIG. 11) are bored in the lower plate 13B at corresponding positions relative to the vibration insulator mount holes 13C. In this instance, the loose openings 13D are used as openings at the time of mounting vibration insulators 20 to the vibration insulator mount holes 13C, for introducing from beneath a lower rubber bush 20B and a disc member 20D of the vibration insulator 20, which will be described hereinafter.

Indicated at 14 is a left front support post which is extended downward from a left end portion of the support base 13, at 15 is a left rear support post which is extended downward from a left end portion of the support base 13, at 16 is a right front support post substantially of L-shape which is extended downward from a right end portion of the support base 13, and at 17 is a right rear support post which is extended downward from a right end portion of the support base 13. Upper ends of these support posts 14 to 17 are securely fixed to the support base 13 by bolts 18, while there lower ends are fixed to the revolving frame 5.

Figure 5:
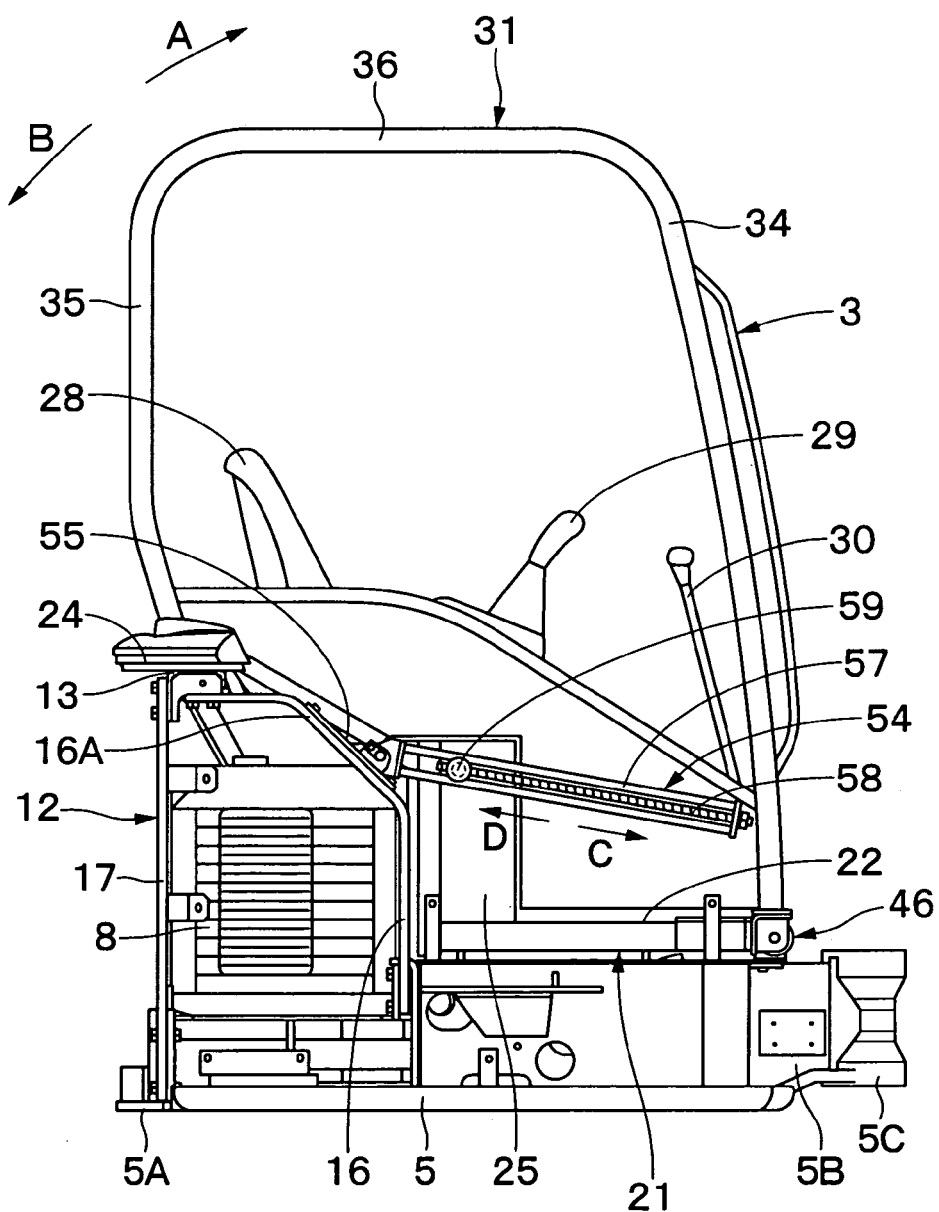
FIG. 5 is a back view of the upper revolving structure, taken from the opposite side of FIG. 4.
Figure 23:
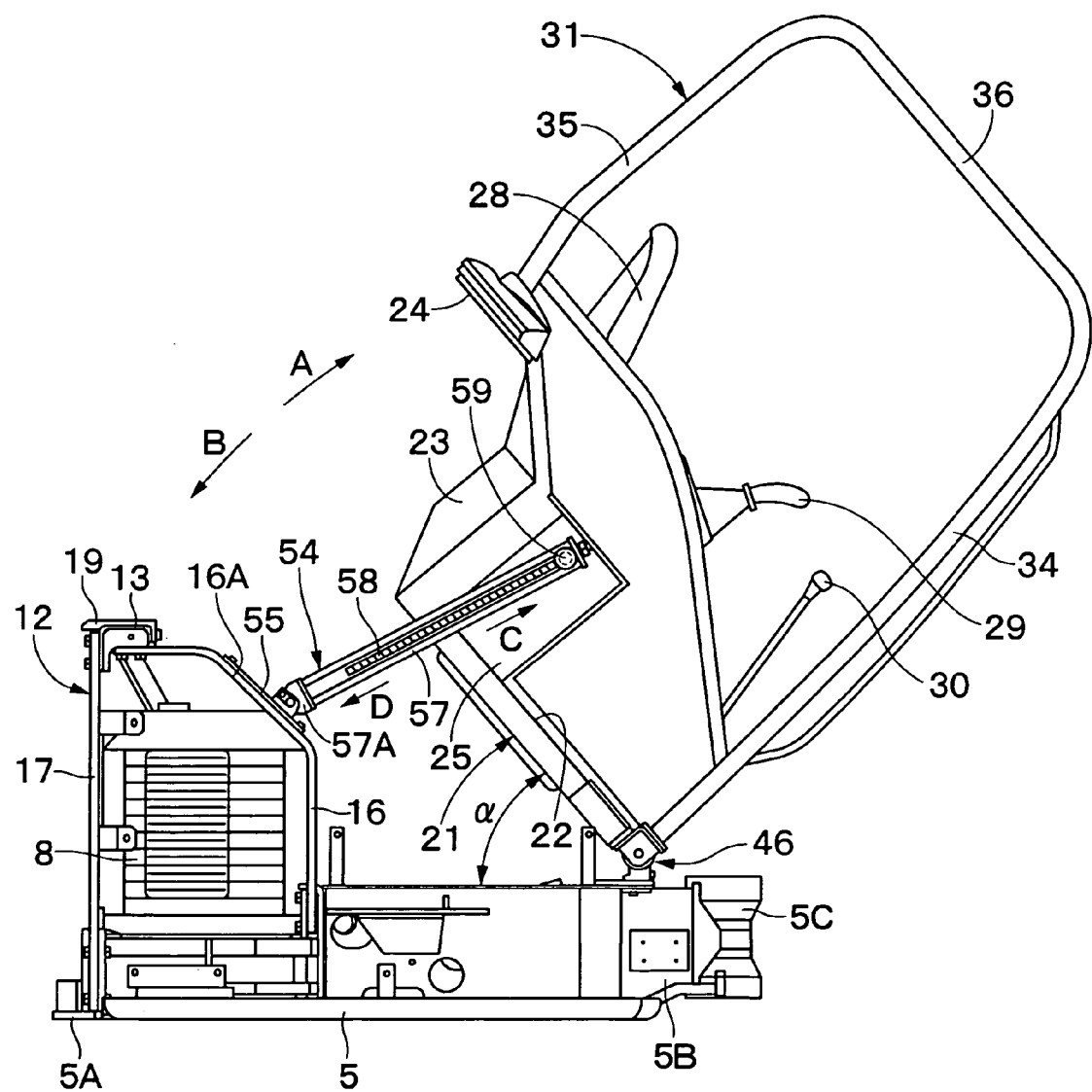
FIG. 23 is a back view of the upper revolving structure, with the floor panel and canopy tilted up.

In this instance, the right front support post 16 is located on the revolving frame 5 at a position to the right of the floor panel 21, which will be described hereinafter, and bent substantially in L-shape to evade the heat exchanger 8 shown in FIG. 5. Further, at a longitudinally intermediate portion, the right front support post 16 is provided with an inclined surface section 16A which is inclined in forward direction as shown in FIG. 8. As shown in FIGS. 5 and 23, through a bracket 55, a guide rail assembly 57 of a tilting mechanism 54, which will be described hereinafter, is supported on the inclined surface section 16A.

Figure 9:
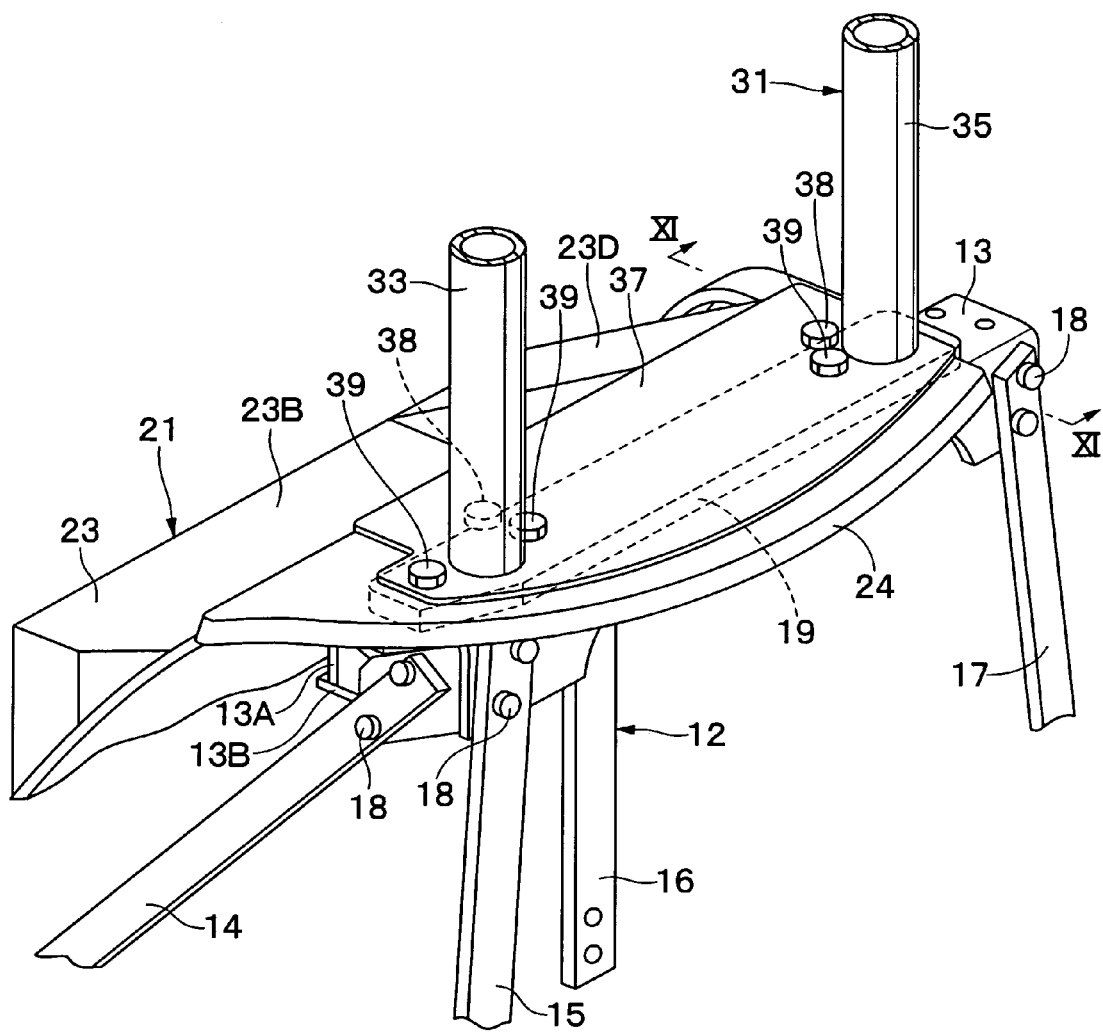
FIG. 9 is a perspective view from back side of a housing mount plate of the floor panel and base plate portion of a canopy which is fixed on a floor panel mount plate on the side of the support member by the use of fastening bolts.
Figure 10:
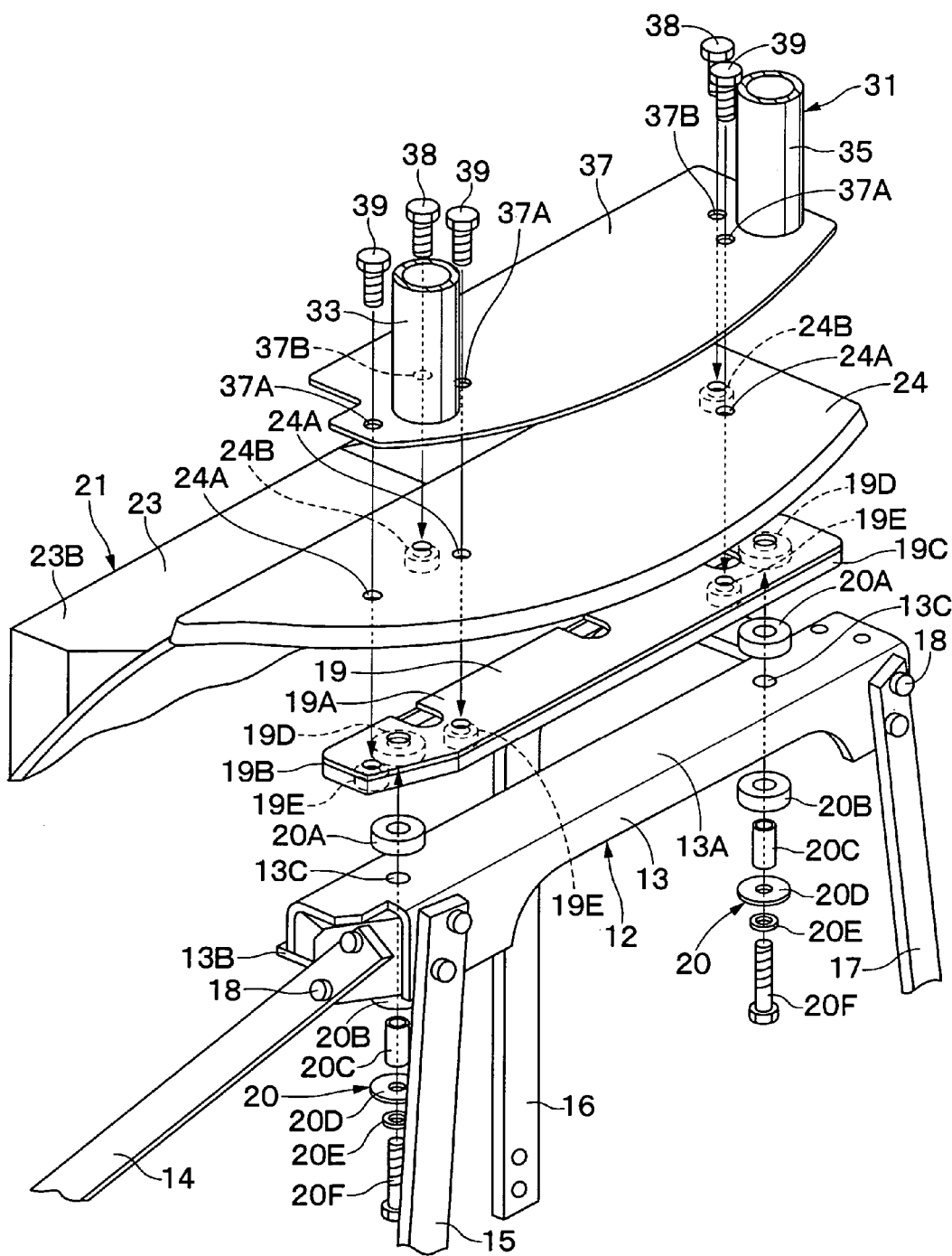
FIG. 10 is an exploded perspective view of the support member, vibration insulators, floor panel mount plate, housing mount plate of the floor panel, base plate portion of the canopy and fastening bolts, taken from the same position as FIG. 9.
Figure 14:
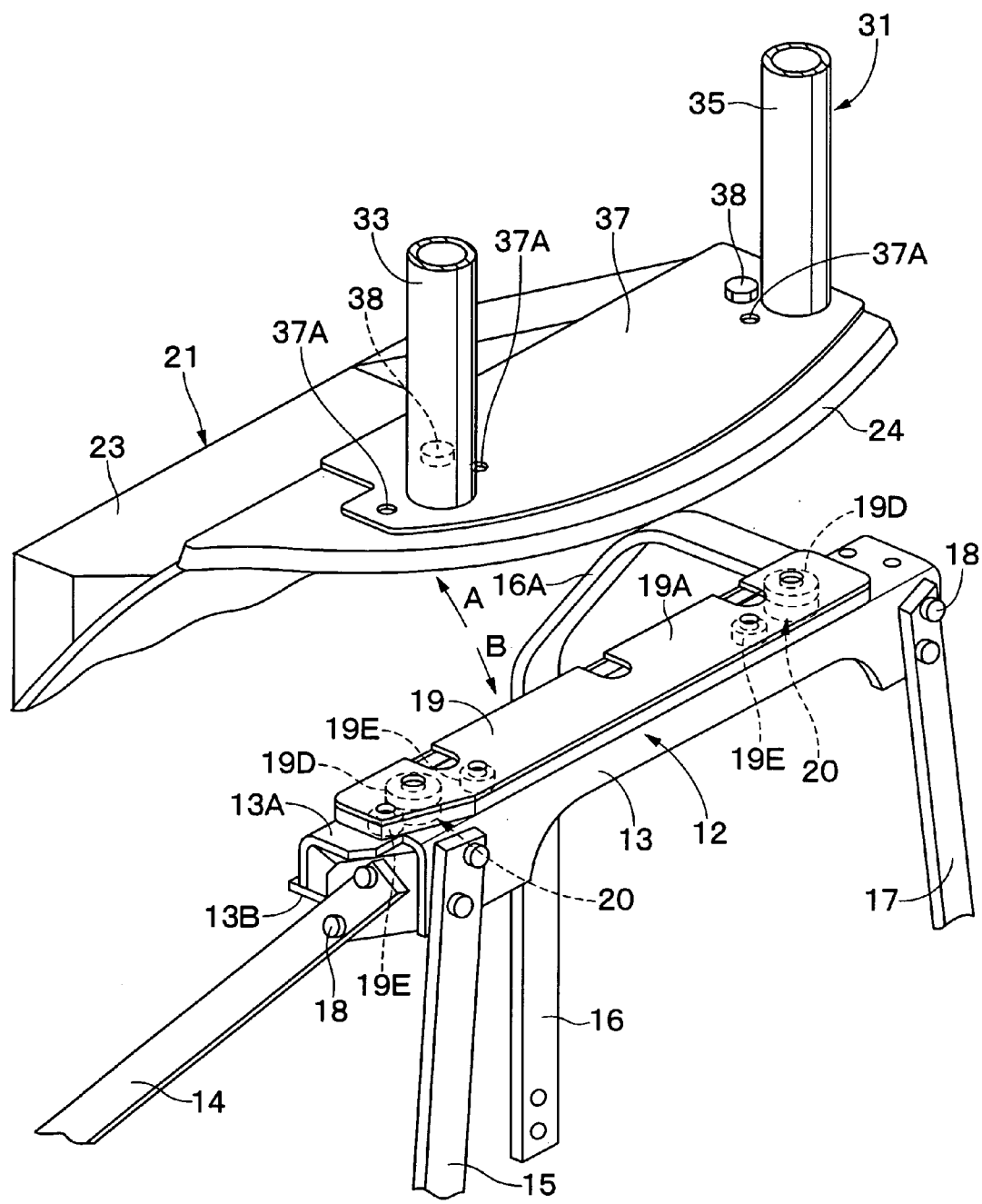
FIG. 14 is a perspective view, taken from the same position as FIG. 9, of a back side portion of a floor panel and a canopy which has been tilted up after removing fastening bolts.

Indicated at 19 is a floor panel mount plate which is located on the upper side of the support member 12 and supported in a vibration-free state by vibration insulators 20, which will be described hereinafter. In this instance, as shown in FIGS. 9, 10 and 14, detachably attached to the floor panel mount plate 19 are a housing mount plate 24 of a floor panel 21 and a base plate 37 of a canopy 31, which will be described hereinafter. The floor panel mount plate 19 is mounted on the support base 13 of the support member 12 through the vibration insulators 20 to serve as a cushion plate for the housing mount plate 24 of the floor panel 21.

Figure 12:
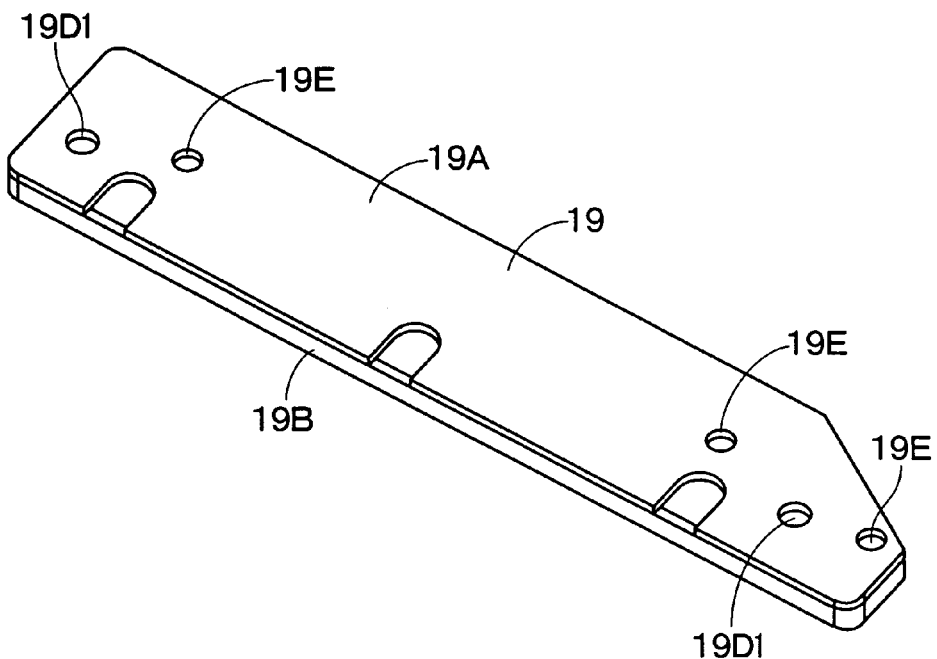
FIG. 12 is a perspective view, taken from above, of the floor panel mount plate of FIG. 10 alone.
Figure 13:
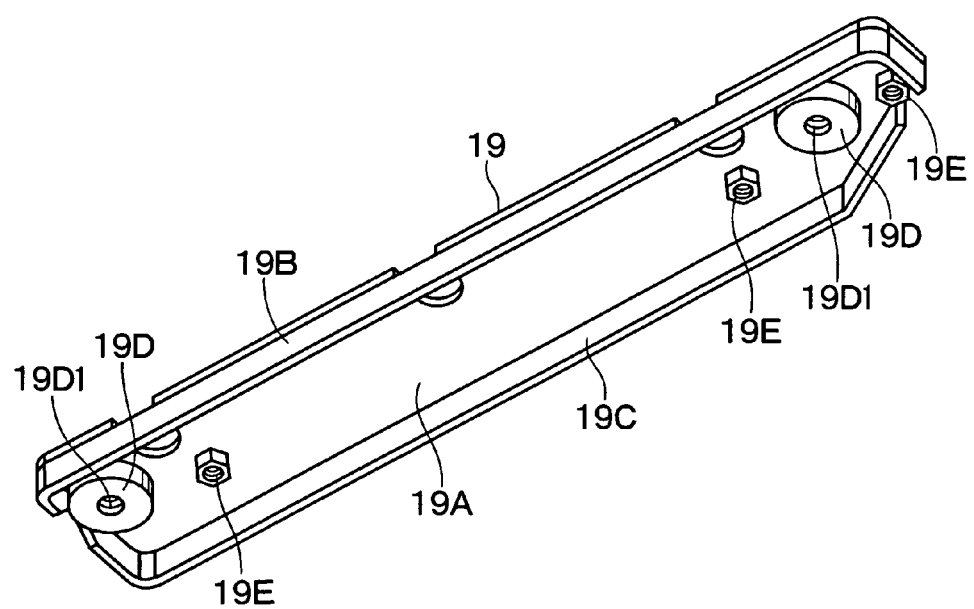
FIG. 13 is a perspective view, taken from beneath, of the floor panel mount plate of FIG. 10.

Further, as shown in FIGS. 12 and 13, the floor panel mount plate 19 is largely constituted by a transversely extending flat plate member 19A of substantially rectangular shape, front and rear vertical fringe portions 19B and 19C which are extended downward along the marginal edges of the flat plate member 19A, a couple of vibration insulator mount portions 19D of a thick cylindrical shape which are each provided with a female screw 19D1 at a center portion thereof and securely fixed to opposite right and left end portions on the lower side of the flat plate member 19A, and three welded nuts 19E as female screws which are securely fixed on the lower side of the flat plate member 19A at positions which are spaced from each other and from the vibration insulator mount portions 19D.

In this instance, as shown in FIGS. 10 and 11, mount bolts 20F of vibration insulators 20, which will be described hereinafter, are threaded from beneath into the female screws 19D1 at the center of the vibration insulator mount portions 19D on the lower side of the flat plate member 19A. Therefore, the vibration insulator mount portions 19D are fixed in aligned positions relative to the vibration insulator mount holes 13C in the support base 13 of the support member 12.

Further, as shown in FIGS. 10 and 14, two of the three welded nuts 19E are located in radially opposite sides of a vibration insulator mount portions 19D in the left side portion of the flat plate member 19A, while a remaining welded nut 19E is located in the vicinity of the other vibration insulator mount portions 19D in the right side portion of the flat plate member 19A. In this instance, fastening bolts 39, which will be described hereinafter, are threaded into the three welded nuts 19E from above to fix on the floor panel mount plate 19 the housing mount plate 24 of the floor panel 21, which will be described hereinafter. These fastening bolts 39 are removed from the respective welded nuts 19E at the time of tilting the floor panel 21.

Indicated at 20 are a couple of vibration insulators which are interposed between the support base 13 and the floor panel mount plate 19 of the support member 12. As shown in FIGS. 10 and 14, the vibration insulators 20 are located in opposite right and left end portions of the support base 13. These vibration insulators 20 make the floor panel mount plate 19 function as a cushion plate for suppressing vibrations which are transmitted from the revolving frame 5 (support member 12) to rear portions of the floor panel 21 which will be described hereinafter.

In this instance, as shown in FIG. 11, the vibration insulators 20 are located in aligned positions relative to the vibration insulator mount holes 13C, and constituted by thick cylindrical upper and lower rubber bushes 20A and 20B which are located to hold the base plate 13A of the support base 13 from upper and lower sides as resilient members, a sleeve 20C which is vertically fitted in the upper and lower rubber bushes 20A and 20B and the vibration insulator mount hole 13C, a disc member 20D which is abutted against lower end faces of the lower rubber bush 20B and the sleeve 20C, and a mount bolt 20F which is threaded into the female screw 19D1 in the vibration insulator mount portion 19D on the floor panel mount plate 19, through the disc member 20D and the sleeve 20C and tightened against the disc member 20D through a washer 20E.

Thus, by the vibration insulators 20, the floor panel mount plate 19 is supported in a vibration-proof state on the support member 12. Namely, through elastic deformations of the upper and lower rubber bushes 20A and 20B, the vibration insulator 20 attenuates vibrations which are transmitted from the side of the revolving frame 5 through the support member 12, suppressing transmission of vibrations to the side of the floor panel 21.

Denoted at 21 is a floor panel which is provided on a left side section of the revolving frame 5. At the front end of the floor panel 21 is supported on a front end of the revolving frame 5 through floor panel support mechanisms 40 and 46 which will be described hereinafter. The rear end section of the floor panel 21 is detachably fixed on the floor panel mount plate 19 by the use of fastening bolts 39, which will be described hereinafter.

Figure 7:
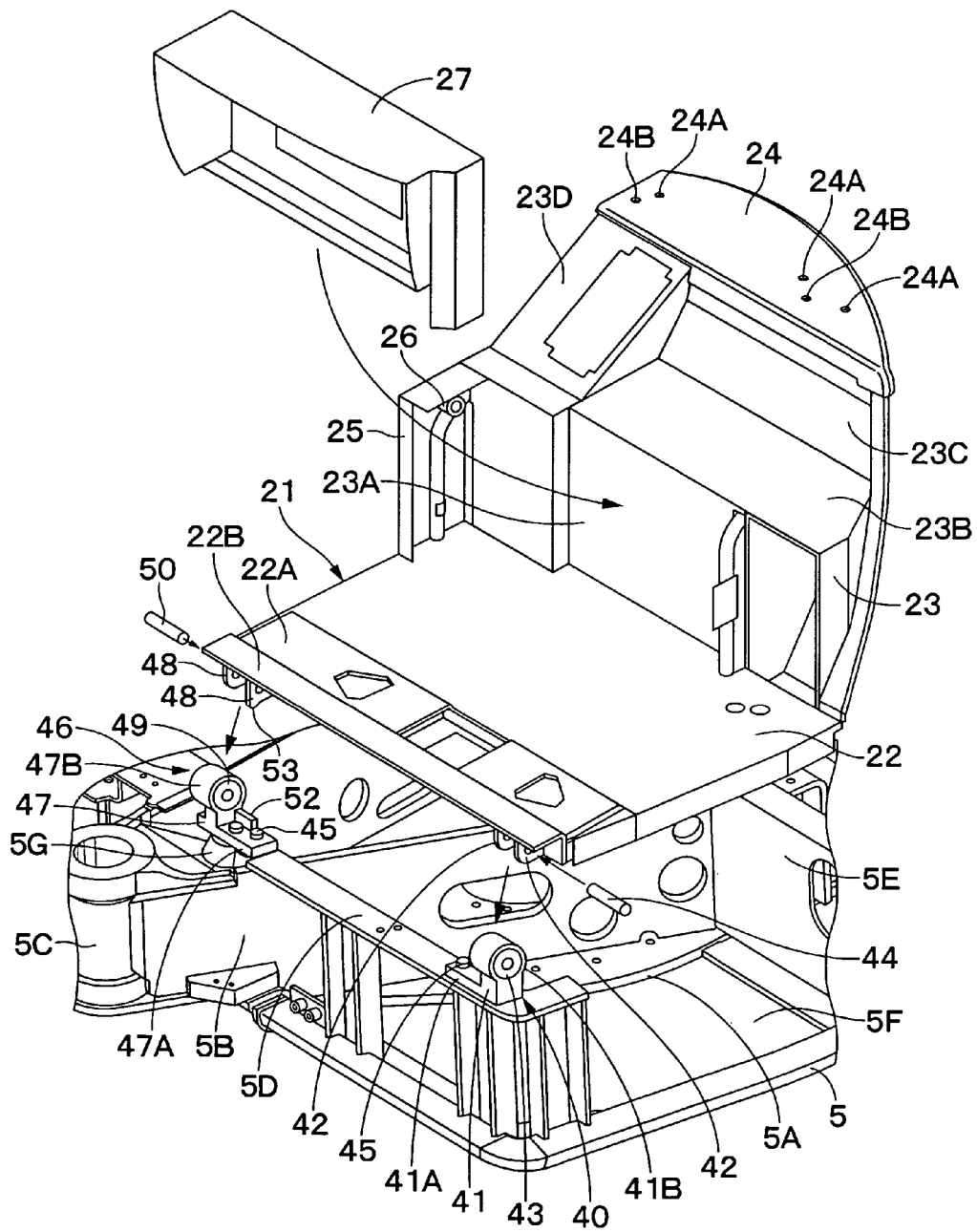
FIG. 7 is an exploded perspective view of the floor panel, stool member and floor panel support mechanism shown in FIG. 6.

In this instance, as shown in FIGS. 4, 5 and 7, the floor panel 21 is largely constituted by a foot rest panel 22 which supports feet of an operator who is seated on an operator's seat 28 which will be described hereinafter, a partition panel 23 which is located on the rear side of the foot rest panel 22, a housing mount plate 24 which is projected rearward from upper end of the partition panel 23, and an upright side panel 25 which rises at and from the right side of the foot rest panel 22.

In the case of the particular embodiment shown, provided in a front portion of the foot rest panel 22 is a lever/pedal mount portion 22A for mounting vehicle control levers/pedals 30, which will be described hereinafter. A support mechanism mount plate 22B is transversely extended along the front side of the lever/pedal mount portion 22A. Provided on the support mechanism mount plate 22B are brackets 42 and 48 for connecting floor panel support mechanisms 40 and 46, which will be described hereinafter.

The partition panel 23, which constitutes a rear portion of the floor panel 21, rises upward from the rear side of the foot rest panel 22 and then extends rearward over the engine 6. That is to say, the engine 6 is located underneath the partition panel 23. More particularly, as shown in FIG. 7, the partition panel 23 is constituted by a riser wall 23A which stands up from rear end of the foot rest panel 22, a seat support stand 23B which extends rearward from upper end of the riser wall 23A to support from beneath an operator's seat 28 which will be described hereinafter, a back plate 23C which rises upward from rear end of the seat support stand 23B, and an instrument mount portion 23D which is located on the right side of the seat support stand 23B and the back plate 23C. An operator's seat 28 is mounted on the seat support stand 23B, while instruments such as switches and monitor (not shown) are mounted on the instrument mount portion 23D, as described hereinafter.

Further, the housing mount plate 24 of the floor panel 21 is formed in an arcuate shape from left to rear side, in conformity with the arcuate shape of the upper revolving structure 3. Three bolt holes 24A in total are bored in the housing mount plate 24, at aligned positions relative to the three welded nuts 19E which are provided on the floor panel mount plate 19 as shown in FIG. 10. Further, on the lower side of the housing mount plate 24, a couple of welded nuts 24B are attached at positions on the front side of the bolt holes 24A in the opposite end portions. These welded nuts 24B provide female screws for mounting a base plate 37 of a canopy 31, which will be described hereinafter.

On the other hand, the side panel 25 of the floor panel 21 is formed substantially in the shape of a rectangular plate rising upward from a rear portion of the right side of the foot rest panel 22, along the instrument mount portion 23D of the partition panel 23. Provided in the top side of the side panel 25 is a sleeve 26 to which a tilting mechanism 54 is rotatably attached for tilting the floor panel 21 as described hereinafter.

Indicated at 27 is a stool member to be placed on top of the floor panel 21. As shown in FIG. 7, the stool member 27 is attached to the front side of the riser wall 23A of the partition panel 23. Together with the seat support stand 23B of the partition panel 23, the stool member 27 support from beneath an operator's seat 28 which will be described hereinafter.

Figure 6:
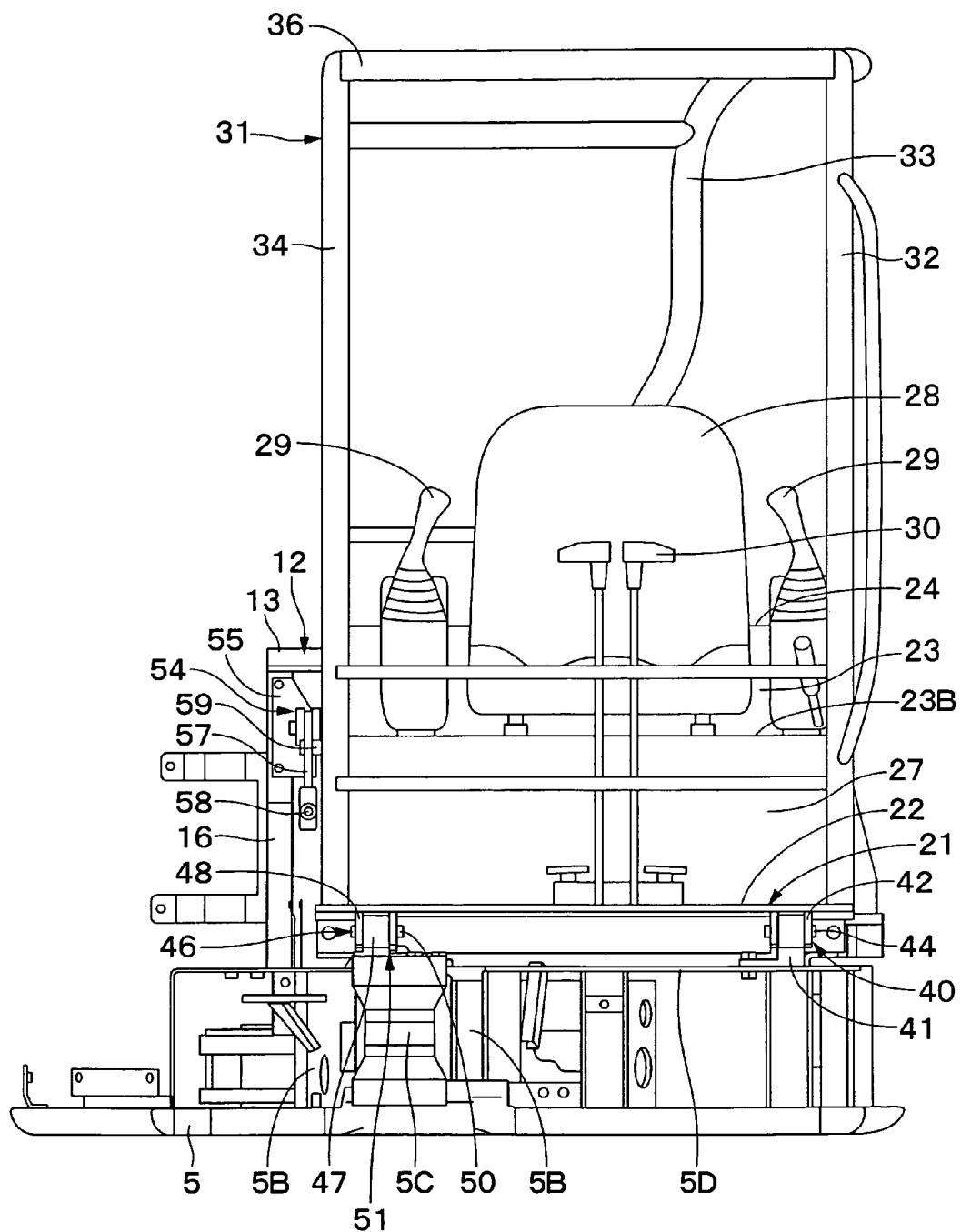
FIG. 6 is an enlarged left-hand side view of the upper revolving structure.

Indicated at 28 is an operator's seat which is mounted on the floor panel 21. As shown in FIGS. 4 and 6, the operator's seat 28 is provided on top of the seat support stand 23B of the partition panel 23 and the stool member 27, and taken by an operator. Further, working mechanism control levers 29 for control the working mechanism 4 are provided at the right and left sides of the operator's seat 28.

Indicated at 30 are vehicle control levers/pedals which are located in fore side of the operator's seat 28 and mounted on the lever/pedal mount portion 22A of the foot rest panel 22 in the front side of the floor panel 21. These vehicle control levers/pedals 30 are operated either manually or by a footing action when the automotive lower structure 2 is put in travel.

Denoted at 31 is a canopy which is provided on the floor panel 21 as a sort of housing which covers the ambience of the operator's seat 28. As shown in FIGS. 2, 4 to 6, the canopy 31 is in the form of a four-post canopy, which is constituted by a left front post 32, a left rear post 33, a right front post 34, a right rear post 35 and a roof 36. Further, as shown in FIGS. 9, 10 and 14, a flat base plate 37 is provided at the rear side of the canopy 31. The base plate 37 is constituted by a single plate which integrally connects lower end portions of the left rear post 33 and the right rear post 35.

In this instance, as shown in FIG. 10, three bolt holes 37A are bored in the base plate 37 of the canopy 31 at positions relative to the three welded nuts 19E which are provided on the floor panel mount plate 19. Further, on the front side of the bolt holes 37A, a couple of bolt holes 37B are bored in the base plate 37 at aligned positions relative to the couple of welded nuts 24B on the housing mount plate 24.

Further, at the front side of the canopy 31, lower ends of the left front post 32 and right front post 34 are fixed to the support mechanism mount plate 22B of the foot rest panel 22 of the floor panel 21 by means of bolts (not shown). On the other hand, as shown in FIGS. 9 and 10, the rear end of the canopy 31 is securely fixed on the housing mount plate 24 of the floor panel 21 by mount bolts 38 into the welded nuts 24B on the housing mount plate 24 through the bolt holes 37B in the base plate 37.

Furthermore, the base plate 37 of the canopy 31 is detachably fixed to the floor panel mount plate 19 together with the housing mount plate 24 by fastening bolts 39 which are threaded into the welded nuts 19E of the floor panel mount plate 19 through the bolt holes 37A and bolt holes 24A in the housing mount plate 24, as described hereinafter.

Denoted at 39 are three fastening bolts for detachably fixing the housing mount plate 24 of the floor panel 21 to the floor panel mount plate 19. By these fastening bolts 39, the base plate 37 of the canopy 31 is also fixed to the floor panel mount plate 19 together with the housing mount plate 24 of the floor panel 21. The fastening bolts 39 are removed from the floor panel mount plate 19 at the time of tilting the floor panel 21.

Namely, as shown in FIG. 10, the fastening bolts 39 are threaded into the welded nuts 19E on the floor panel mount plate 19 through the bolt holes 37A in the base plate 37 of the canopy 31 and the bolt holes 24A in the housing mount plate 24 of the floor panel 21. Thus, the housing mount plate 24 of the floor panel 21 as well as the base plate 37 of the canopy 31 is detachably fastened to the floor panel mount plate 19.

On the other hand, in order to free the fastening bolts 39 from threaded engagement with the welded nuts 19E on the floor panel mount plate 19, each fastening bolt 39 is loosened and removed by the use of a tool like a spanner from the top side of the base plate 37. By so doing, the floor panel 21 is freed from the floor panel mount plate 19 on the side of the revolving frame 5, and the floor panel 21 and canopy 31 are now tiltable forward or upward in the direction of arrow A in FIG. 14.

In this instance, the floor panel 21, operator's seat 28, working mechanism control levers 29, vehicle control levers/pedals 30 and canopy 31 are assembled as one unit which can be tilted up about a supporting point on floor panel support mechanisms 40 and 46, which will be described hereinafter. When the fastening bolts 39 are removed, the assembled unit of the floor panel 21 and the canopy 31 can be turned about a supporting point on floor panel support mechanisms 40 and 46 and tilted forward or upward in the direction of arrow A or tilted backward or downward in the direction of arrow B by a tilting mechanism 54, which will be described hereinafter.

Indicated at 40 is a floor panel support mechanism which is provided on the left side (hereinafter referred to as "left floor panel support mechanism 40"), between a front end of the revolving frame 5 and a front end of the foot rest panel 22 of the floor panel 21. In cooperation with a right floor panel support mechanism 46, which will be described hereinafter, the left floor panel support mechanism 40 supports the front end of the floor panel 21 on the front end of the revolving frame 5 tiltably about a transversely extending axis (longitudinal axes of joint pins 44 and 50 which will be described hereinafter).

As shown in FIG. 7, the left floor panel support mechanism 40 is largely constituted by a bracket 41 on the side of the frame which is mounted on the front beam 5D at the fore end of the revolving frame 5, a pair of mount plates 42 on the side of the floor panel which are provided at the fore end of the foot rest panel 22, at a vertically opposing position relative to the bracket 41, a piece of cylindrical vibration insulating rubber 43 which is fitted in the bracket 41 on the side of the frame as a vibration damping member, and a joint pin 44 which pivotally connects the mount plates 42 with the bracket 41 on the side of the frame through the cylinderical vibration insulating rubber 43.

In this instance, the bracket 41 on the side of the frame is formed in the shape as shown in FIGS. 3 and 7, for example, by the use of a casting means. In this case, the bracket 41 is constituted by a base stand 41A which is fixed to the front beam 5D of the revolving frame 5 by means of bolts 45, and a tubular support member 41B which is fixed on the base stand 41A with its center axis disposed in the transverse direction.

The right and left mount plates 42 are each in the form of a plate of substantially square shape as shown in FIG. 7 and adapted to support both end portions of the joint pin 44 in respective center bores. Further, the mount plates 42 are integrally fixed, for example, by welding to the support mechanism mount plate 22B of the foot rest panel 22 in parallel relation with each other and at positions which are spaced from each other by a distance larger than the length of the tubular support member 41B of the bracket 41 on the side of the revolving frame.

The vibration insulating rubber 43 is formed in a thick-wall tubular shape, for example, by the use of resilient rubber material, and the outer periphery of the vibration insulating rubber 43 is fitted in the tubular support member 41B of the bracket 41 on the side of the revolving frame. Vibrations which are transmitted from the revolving frame 5 to the floor panel 21 are absorbed and dampened by the vibration insulating rubber 43 through resilient deformations between the bracket 41 on the side of the frame and the mount plates 42 (the joint pin 44).

Further, the joint pin 44 is passed centrally through the vibration insulating rubber 43 which is fitted in the tubular support member 41B of the bracket 41, and both ends supported on the right and left mount plates 42.

Indicated at 46 is a right floor panel support mechanism hereinafter referred to as "right floor panel support mechanism 46" which is provided between a central front side portion of the revolving frame 5 and a right front side portion of the foot rest panel 22 of the floor panel 21. Along with the above-described left floor panel support mechanism 40, the right floor panel support mechanism 46 tiltably supports the fore end of the floor panel 21 at the front side of the revolving frame 5.

The right floor panel support mechanism 46 is arranged similarly to the left floor panel support mechanism 40. Namely, the right floor panel support mechanism 46 is largely constituted by a bracket 47 on the side of the frame which is fixed on the mount seat 5G at a front side of the revolving frame 5, a pair of right and left mount plates 48 which are fixed at a front side of the foot rest panel 22 at vertically confronting positions relative to the bracket 47 on the side of the frame, tubular vibration insulating rubber 49 which is fitted in the bracket 47 as a vibration damping member, and a joint pin 50 which pivotally connects the mount plates 48 with the bracket 47 through the vibration insulating rubber 49.

Figure 15:
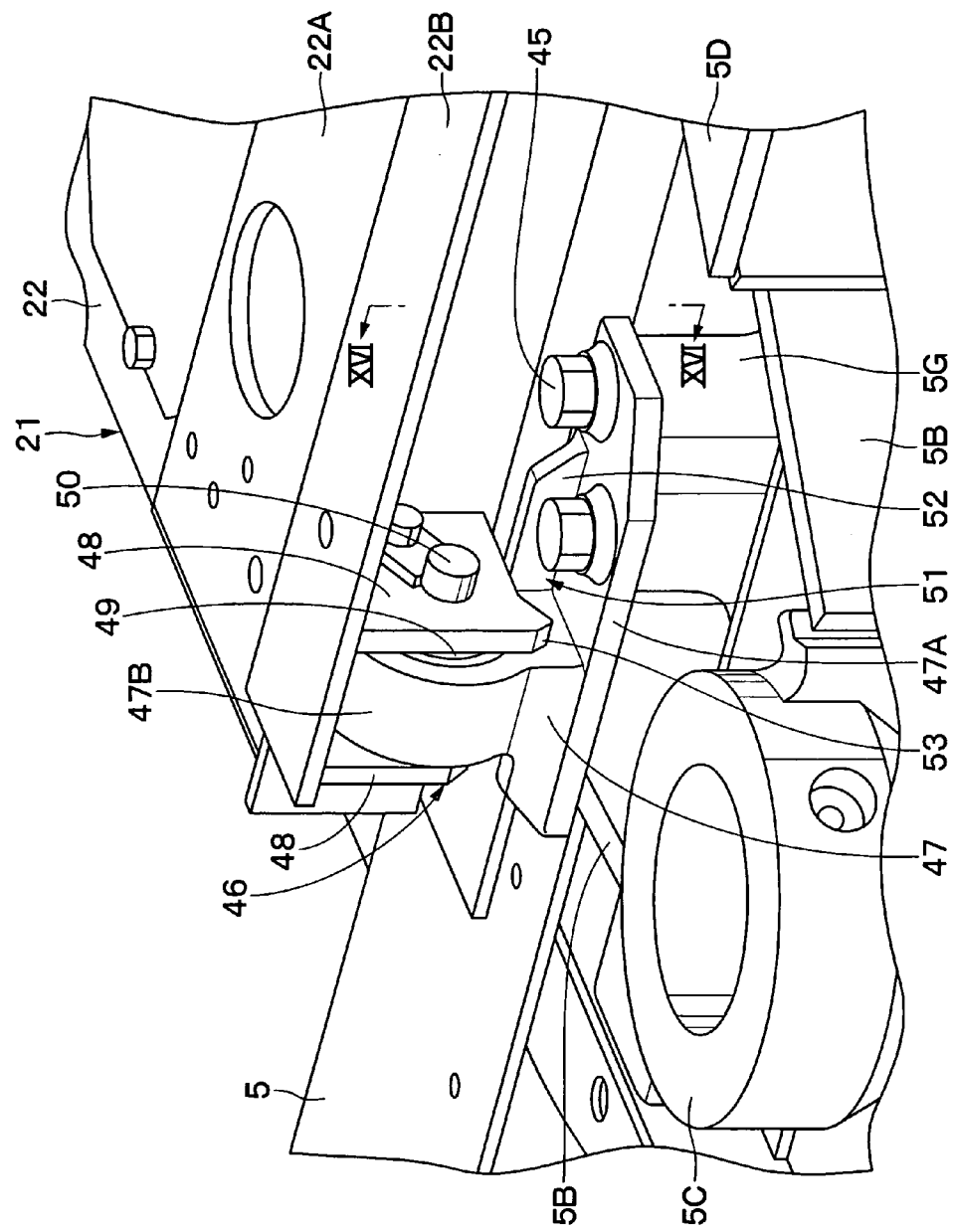
FIG. 15 is an enlarged perspective view, showing a right floor panel support mechanism and a tilting stopper together with a revolving frame and floor panel.
Figure 16:
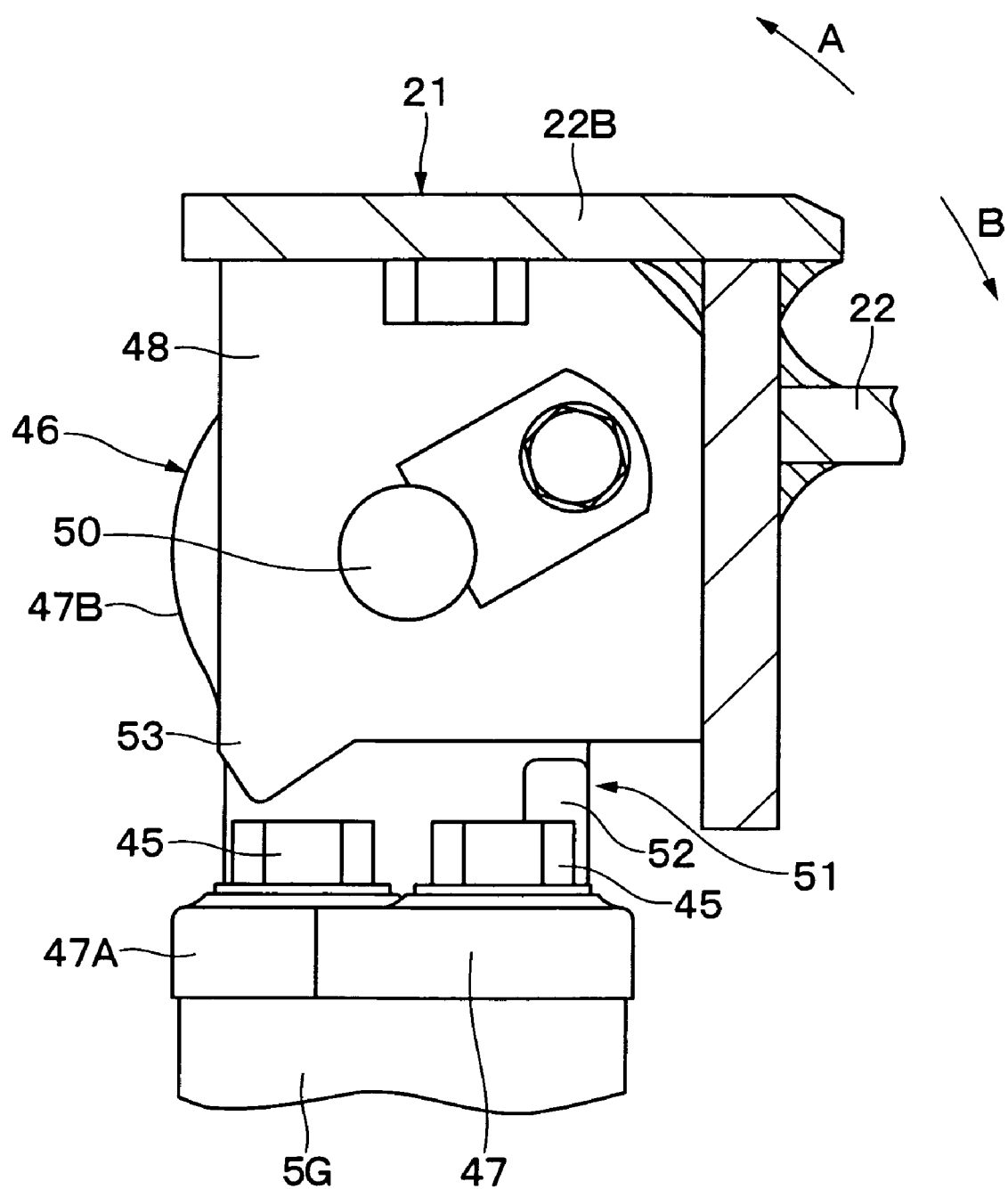
FIG. 16 is an enlarged sectional view of the right floor panel support mechanism and tilting stopper, taken in the direction of arrows XVI-XVI of FIG. 15.
Figure 17:
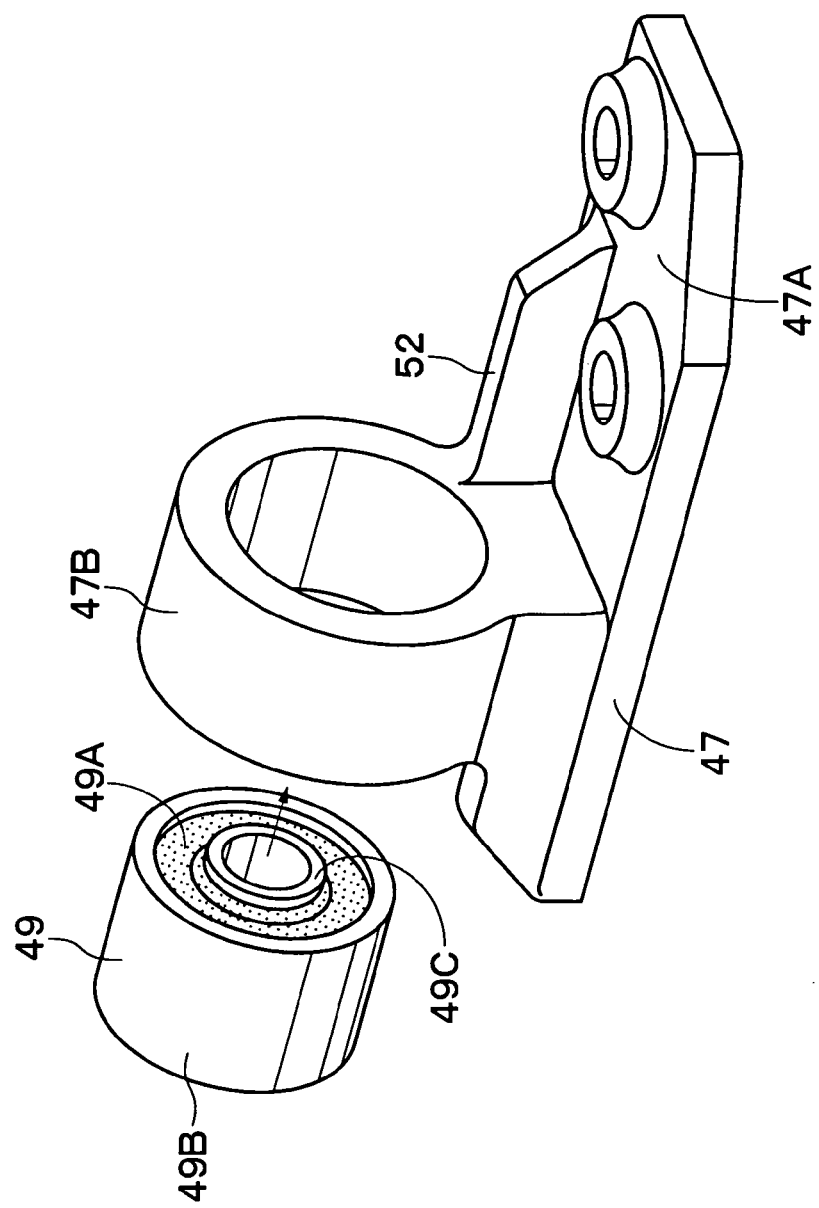
FIG. 17 is an exploded perspective view of a bracket on the side of the frame, which is provided with a load support portion of the tilting stopper, and vibration insulating rubber.

In this instance, as shown in FIGS. 15 to 17, the bracket 47 on the side of the frame is constituted by a mount stand 47A which is fixed on the mount seat 5G of the revolving frame 5 by the use of bolts 45, and a tubular support member 47B which is fixedly mounted on the mount stand 47A, that is, having its center axis disposed in the transverse direction. Further, provided at a side of the mount stand 47A and the tubular support member 47B of the bracket 47 is a load support portion 52 which will be described hereinafter. The bracket 47 is formed, for example, by the use of a casting means, integrally with the load support portion 52.

As shown in FIG. 15, the right and left mount plates 48 are each in the form of a substantially square plate and adapted to support both end portions of the joint pin 50 in respective center bores. The mount plates 48 are integrally provided, for example, by welding to the support mechanism mount plate 22B of the foot rest panel 22 in parallel relation with each other and at positions which are spaced from each other by a distance larger than the length of the tubular support member 47B of the bracket 47. An abutting portion 53, which will be described hereinafter, is formed integrally at a front lower corner portion of one of the right and left mount plates 48 (the one on the left side when seen from behind the vehicle).

Further, as shown in FIG. 17, the vibration insulating rubber 49 is constituted by a rubber tube 49A which is formed in the shape of a thick-wall tubular shape, for example, by the use of resilient rubber material, an outer tube 49B in the form of a metal ring which is fixedly fitted on the outer periphery of the rubber tube 49A, and an inner tube 49C in the form of a metal ring which is fixedly fitted in the inner periphery of the rubber tube 49A. The vibration insulating rubber 49 is set on the bracket 47 on the side of the frame by fitting the outer tube 49B in the tubular support member 47B.

The joint pin 50 is passed through the inner tube 49C of the vibration insulating rubber 49 which is fitted in the tubular support member 47B of the bracket 47 on the side of the frame, and opposite end portions of the joint pin 50 are supported on the mount plates 48. Vibrations which are transmitted from the revolving frame 5 to the floor panel 21 are attenuated or damped by resilient deformation of the rubber tube 49A between the outer and inner tubes 49B and 49C of the vibration insulating rubber 49, including vibrations not only in vertical direction but vibrations in lateral direction or in back and forth direction. In this regard, the vibration insulating rubber 43 of the above-described left floor panel support mechanism 40 is constructed in the same way as the vibration insulating rubber 49 of the right floor panel support mechanism 46.

Thus, as shown in FIGS. 6, 7, 15 to 17, 20 and 21, the left and right floor panel support mechanisms 40 and 46 are arranged to support the floor panel 21 pivotally about the joint pins 44 and 50. Thus, through the floor panel support mechanisms 40 and 46, the floor panel 21 can be tilted up in forward or upward direction (in the direction of arrow A) or tilted down in backward or downward direction (in the direction of arrow B).

Indicated at 51 is a tilting stopper which is provided on the right floor panel support mechanism 46 for restricting a tilting angle of the floor panel 21 to a predetermined position when the floor panel 21 is tilted up in forward or upward direction about supporting point on the floor panel support mechanisms 40 and 46. As shown in FIGS. 15, 16, 20 and 21, the tilting stopper 51 is constituted by a load support portion 52 and an abutting portion 53, which will be described hereinafter.

In this instance, assuming that the tilt angle of the floor panel 21 relative to the revolving frame 5 is α when the floor panel 21 is tilted up to a maximum tilted position by a tilting mechanism 54, which will be described hereinafter, the tilting stopper 51 is located at such an angular position as to restrict the tilt-up angle of the floor panel 21 to an angle which is substantially same as or smaller than the angle α shown in FIGS. 22 and 23.

Thus, the tilting stopper 51 has a function of preventing the canopy 31 from falling forward and coming into collision against the working mechanism 4, and a function of sustaining a load of tilting the floor panel 21 largely in forward direction, preventing imposition of an overload on the tilting mechanism 54 which will be described hereinafter.

Indicated at 52 is a load support portion which is provided on the bracket 47 on the side of the frame. This load support portion 52 is formed integrally with the bracket 47, for example, by the use of a casting means. When the floor panel 21 is largely tilted up in forward direction, the load support portion 52 is brought into abutting engagement with an abutting portion 53, which will be described hereinafter, to sustain loads of the floor panel 21, operator's seat 28, canopy 31 etc. The load support portion 52 is fixedly provided on the left side of the mount stand 47A of the bracket 47, and in the form of a fixed projection which is formed on the mount stand 47A.

Further, right end of the load support portion 52 is extended as far as the tubular support member 47B and integrally fixed in such a way as to form a rib between the mount stand 47A and the tubular support portion 47B. Thus, the load support portion 52 functions as a reinforcing rib between the mount stand 47A and the tubular support portion 47B, enhancing the rigidity of the bracket 47 on the side of the frame.

Indicated at 53 is an abutting portion which is provided on one of the left and right mount plates 48 which is in confronting position relative to the load support portion 52. In this instance, when the floor panel 21 is tilted up through the predetermined angle α in forward direction, the abutting portion 53 is moved (turned) toward the load support portion 52, together with the mount plates 48 which are attached to the floor panel 21. Thus, the abutting portion 53 is formed as a movable projection to be brought into and out of abutment against the load support portion 52. Namely, the abutting portion 53 is in the form of a projection of a substantially triangular shape, which is formed by downwardly extending a lower corner portion of a fore distal end of the mount plate 48 on the left side.

Figure 20:
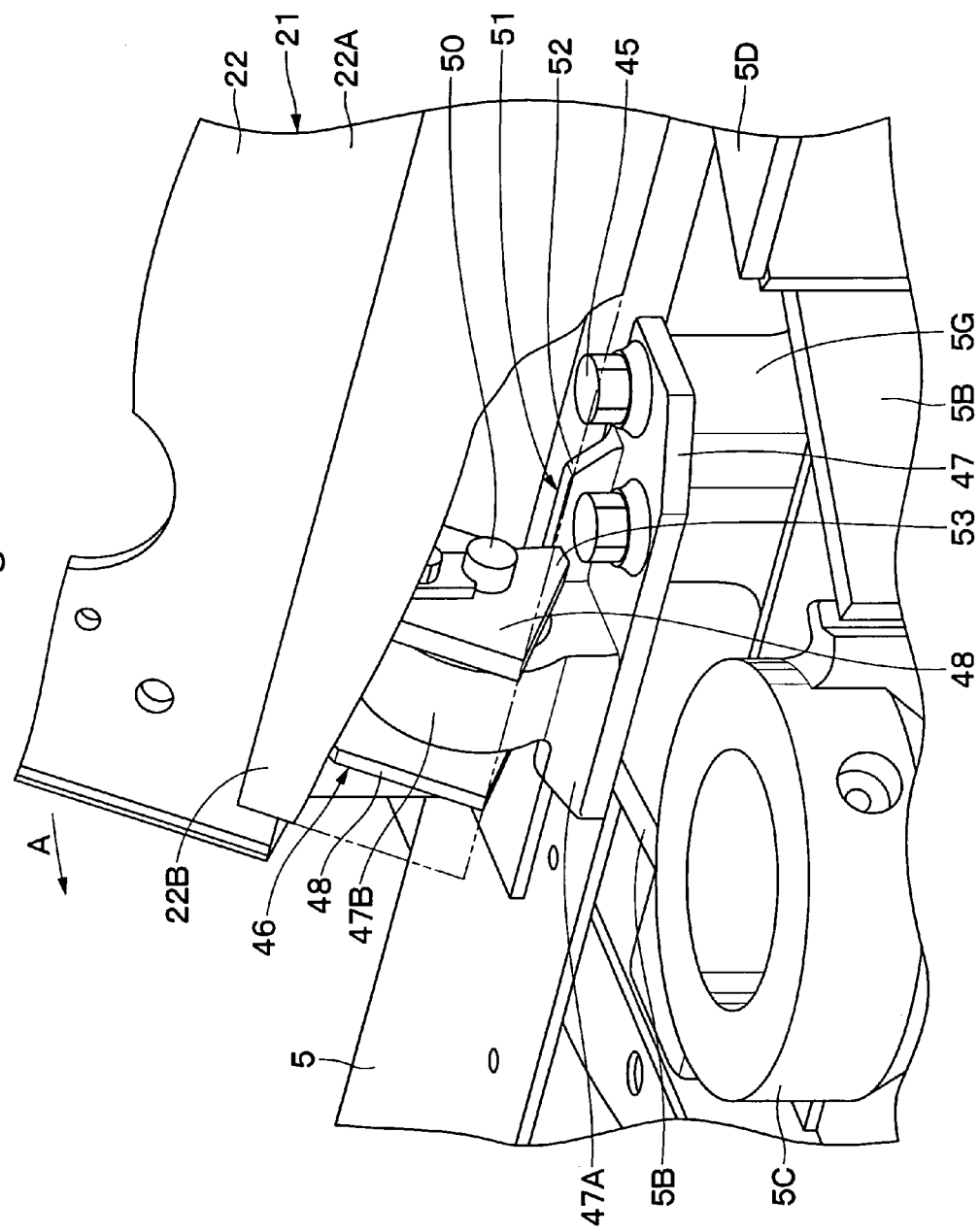
FIG. 20 is an enlarged perspective view, taken from the same position as FIG. 15, of the floor panel which has been largely tilted up until an abutting portion of the tilting stopper is abutted against the load support portion.
Figure 21:
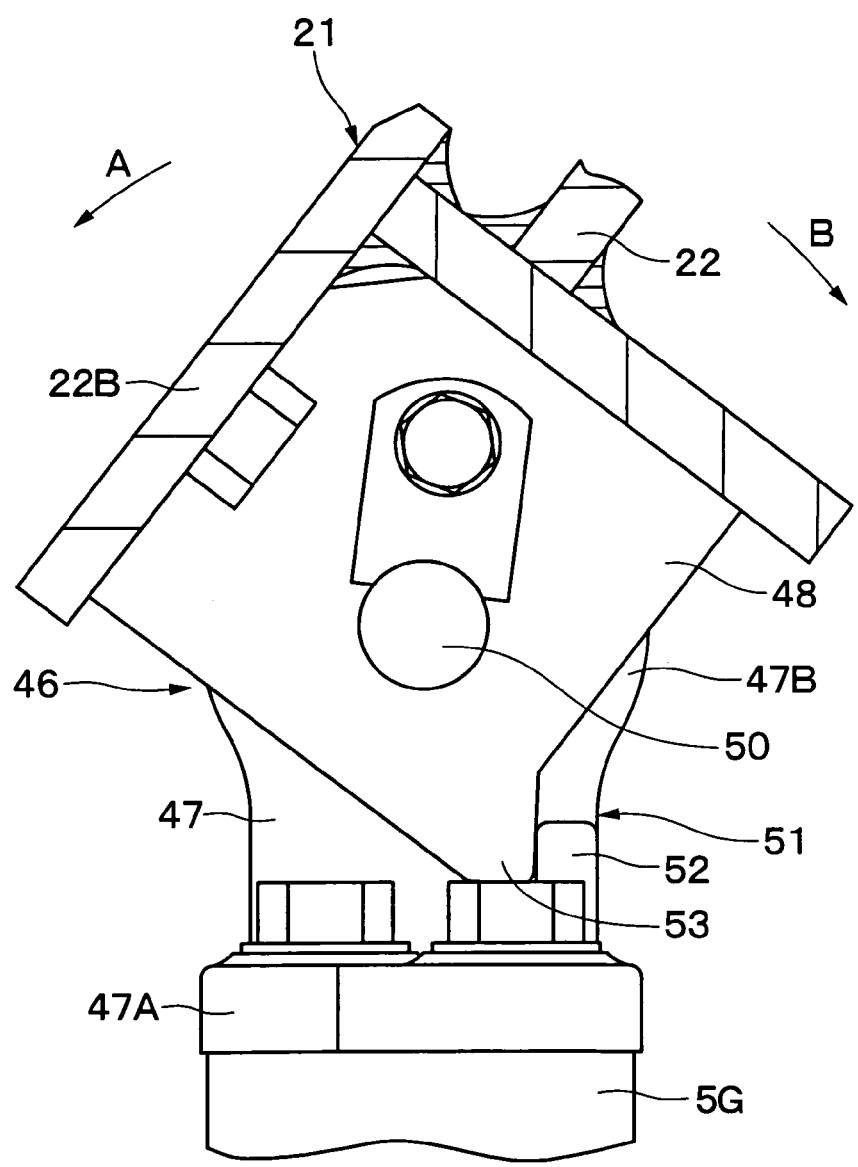
FIG. 21 is an enlarged sectional view, taken from the same position as FIG. 16, of the tilting stopper, with the abutting portion held in abutment against the load support portion.
Figure 22:
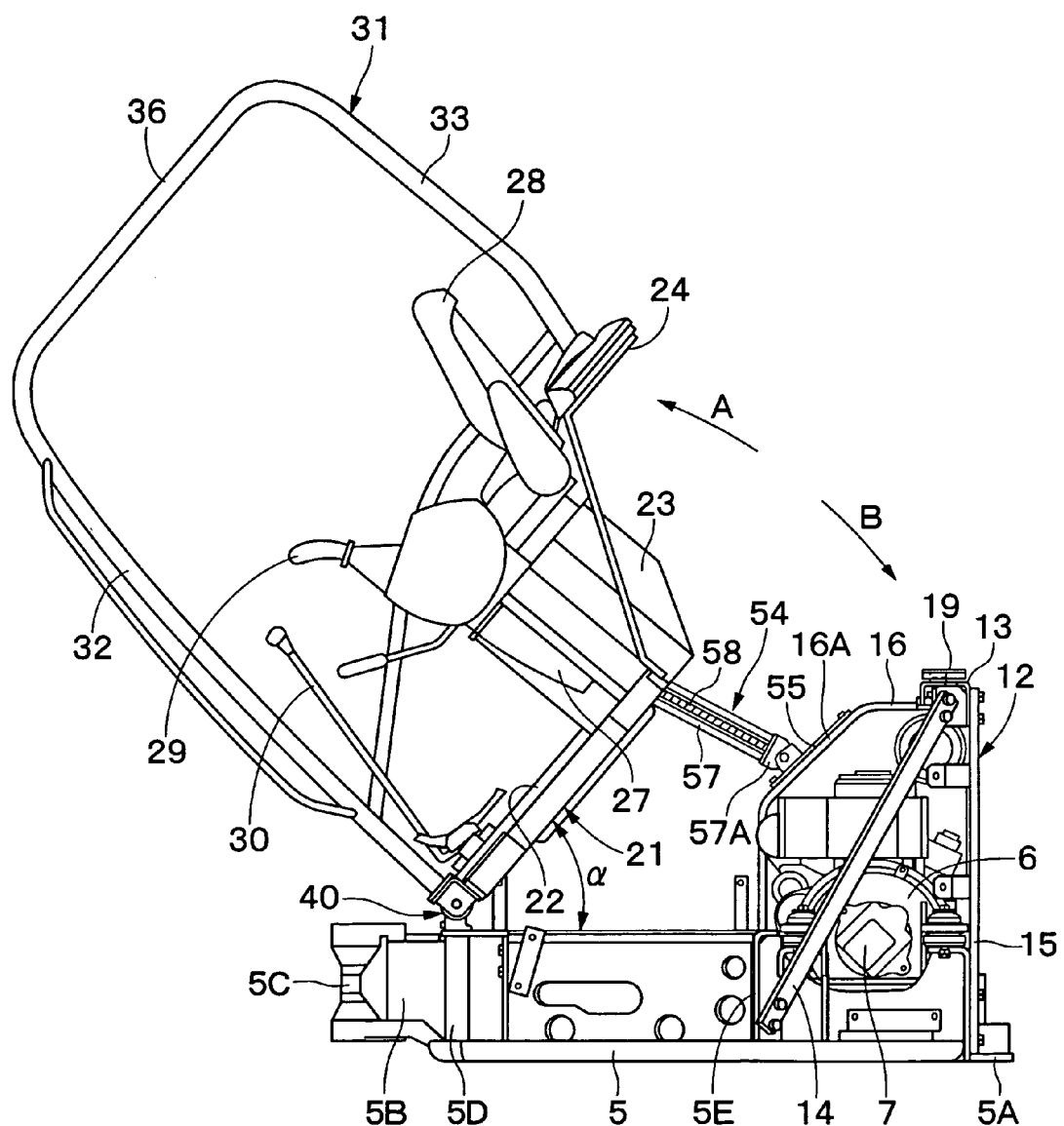
FIG. 22 is a front view of the upper revolving structure, with the floor panel and canopy tilted up by the tilting mechanism.

When the floor panel 21 is largely tilted in forward or upward direction together with the canopy 31, turning about pivoting point on the floor panel support mechanisms 40 and 46 as shown in FIGS. 22 and 23, the tilting stopper 51 functions to restrict the tilt-up angle of the floor panel 21 to a predetermined angular position by bringing the abutting portion 53 on one of the mount plates 48 into abutting engagement with the load support portion 52 which is provided on the bracket 47 on the side of the frame as shown in FIGS. 20 and 21. Thus, the tilting stopper 51 functions to prevent the canopy 31 from falling in forward direction and colliding against the working mechanism 4, and to support loads when the floor panel 21 is tilted up largely in forward direction.

Indicated at 54 is a tilting mechanism which is located between the revolving frame 5 and the floor panel 21 and behind the floor panel support mechanisms 40 and 46. As shown in FIGS. 2, 5, 6, 22 and 23, the tilting mechanism 54 is located at the right side of the floor panel 21 and extended in forward and backward directions. As shown particularly in FIGS. 18 and 19, the tilting mechanism 54 is constituted by a bracket 55, guide rail assembly 57, screw rod 58 and displacement member 59, which will be described hereinafter.

In this instance, the tilting mechanism 54 is arranged to tilt up or tilt down the floor panel 21 about a joint pin 56 which is provided as a pivoting point on the side of the revolving frame 5 and about a displacement member 59 as a displacement point on the side of the floor panel 21, while shifting the position of the displacement member 59 to an arbitrary position, tilting up the floor panel 21 in forward direction (in the direction of arrow A) or tilting down the floor panel 21 in rearward direction (in the direction of arrow B) according to the distance of shift of the displacement member 59.

Designated at 55 is a bracket for mounting the tilting mechanism 54 on the support member 12 on the side of the revolving frame 5. The bracket 55 is constituted by a base plate 55A which is fixedly bolted on the inclined surface section 16A on the right front support post 16 of the support member 12, and a pair of bracket portions 55B which are extended in back and forth directions on the surface of the base plate 55A and located parallel thereto. Through the joint pin 56 which is a pivoting point, a fitting base end portion 57A of a guide rail assembly 57 is pivotally supported on the bracket portions 55B for upward and downward rocking movements, as described in greater detail hereinafter.

Indicated at 56 is a joint pin which pivotally connects a fitting base end portion 57A of a guide rail assembly 57 to the bracket 55 on the side of the support member 12, for upward and downward rocking movements. This joint pin 56 is located between the bracket portions 55B of the bracket 55 and the fitting base end portion 57A of the guide rail assembly 57, constituting a pivoting point of the guide rail assembly 57.

Figure 18:
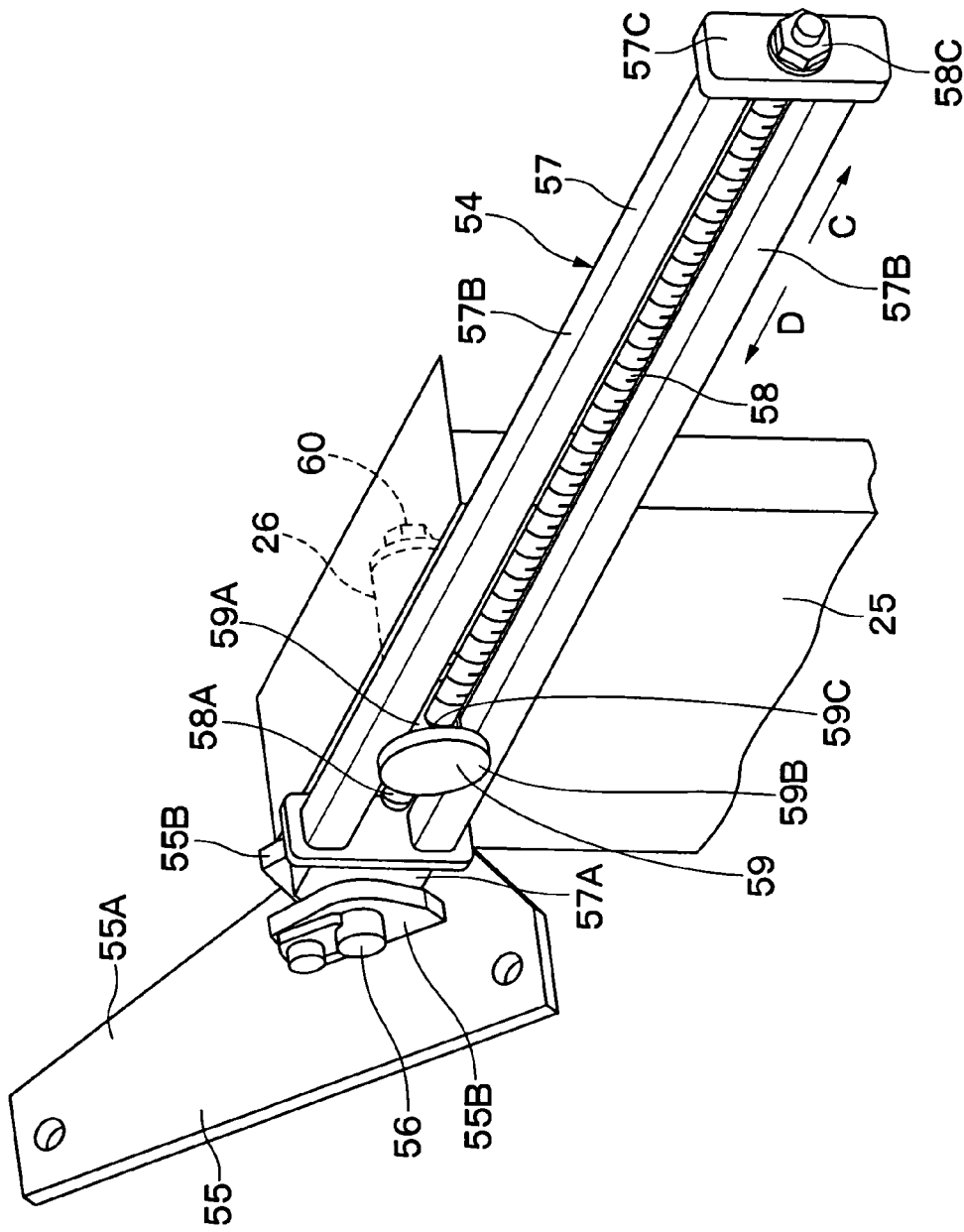
FIG. 18 is an enlarged perspective view of the tilting mechanism in FIG. 5.

Indicated at 57 is a guide rail assembly which is pivotally supported on the right front support post 16 of the support member 12 through the bracket 55 for upward and downward rocking movements. In this instance, as shown in FIGS. 18 and 19, the guide rail assembly 57 is constituted by a fitting base end portion 57A which is pivotally supported on the bracket portions 55B of the bracket 55 through the joint pin 56, a pair of parallel rail members 57B which are extended forward from the fitting base end portion 57A in vertically spaced relations, and an end connector 57C as an end connect portion fitted on fore ends of the rail members 57B.

As shown particularly in FIG. 18, the guide rail assembly 57 is arranged to guide a displacement member 59 linearly, which will be described hereinafter, between the end connector 57C at the fore free end and the fitting base end portion 57A. For this purpose, the guide rail assembly 57 is formed in the shape of a narrow rectangular frame structure as a whole.

Figure 19:
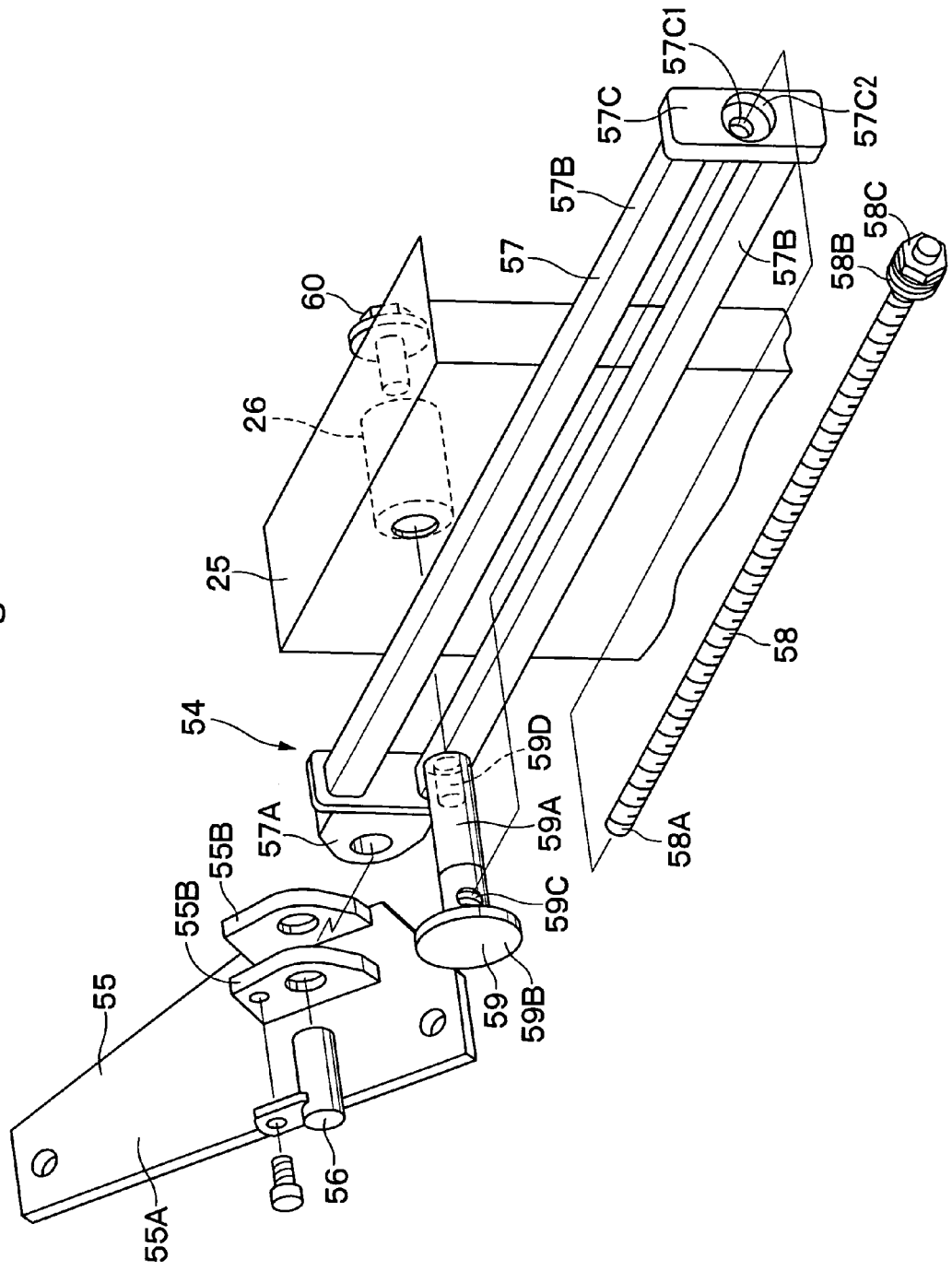
FIG. 19 is an exploded perspective view of the tilting mechanism.

Further, as shown in FIG. 19, the end connector 57C of the guide rail assembly 57 is provided with a stepped hole having on the inner side a small diameter portion 57C1 to receive a fore end portion of a screw rod 58 which is extended between and along the rail members 57B, and on the outer side a large diameter portion 57C2 to receive therein a thrust bearing 58B which rotatably supports a fore end portion of the screw rod 58, as described hereinafter.

Indicated at 58 is a screw rod which is extended between and along the two rail members 57B of the rail assembly 57 as mentioned above. This screw rod 58 is in the form of a rod which is tapped with a screw thread on and around its circumference for threaded engagement with a radial tapped hole 59C in a displacement member 59, which will be described hereinafter. The screw rod 58 is terminated as a free end 58A at its base end, and provided with a thrust bearing 58B and a tool connecting portion 58C at its fore end.

The tool connecting portion 58C of the screw rod 58 is projected through the small diameter portion 57C1 of the end connector 57C, and the thrust bearing 58B is rotatably supported in the large diameter portion 57C2. Rearward of a radial tapped hole 59C of a displacement member 59 which is located between the two rail members 57B, the free end 58A of the screw rod 58 is disposed in a free state.

In this instance, when the thrust bearing 58B is fitted in the end connector 57C of the guide rail assembly 57, the free end 58A of the screw rod 58 is extended rearward beyond the position of the displacement member 59. Namely, the rear free end 58A of the screw rod 58 is extended to a point in the vicinity of the fitting base end portion 57A of the guide rail assembly 57.

Further, the thrust bearing 58B rotatably supports the screw rod 58 to the end connector 57C of the guide rail assembly 57, sustaining thrust loads which act in the axial direction of the screw rod 58 (in the direction of arrow D in FIGS. 18 and 23) at the time of tilting up the floor panel 21.

Further, the tool connecting portion 58C of the screw rod 58 is formed in a hexagonal shape and projected on the front side of the end connector 57C. To the tool connecting portion 58C, which is formed in a hexagonal shape like a bolt head, a screw driving tool like an impact wrench (not shown) can be connected from outside. Thus, by turning the tool connecting portion 58C by an impact wrench or the like, the displacement member 59 which is in threaded engagement with the screw rod 58 is translated along the guide rail assembly 57 in forward or rearward direction.

Debited at 59 is a displacement member which constitutes a displacement point of the tilting mechanism 54. This displacement member 59, in threaded engagement with the screw rod 58, is attached to a side panel 25 of the floor panel 21 through a sleeve 26. As the screw rod 58 is rotated, the displacement member 59 is translated (displaced) on the guide rail assembly 57 in forward direction (in the direction of arrow C) or in rearward direction (in the direction of arrow D).

In this instance, as shown in FIGS. 18 and 19, the displacement member 59 is largely constituted by a stepped cylinderical shaft portion 59A which is extended lateral side, a collar portion 59B which is provided at an outer end of the shaft portion 59A, a radial tapped hole 59C which is bored to radial direction of the shaft portion 59A in the vicinity of the collar portion 59B and held in threaded engagement with the screw rod 58, and a bolt hole 59D which is bored into the other inner end of the shaft portion 59A.

One longitudinal end of the displacement member 59 is movably placed between the rail members 57B of the guide rail assembly 57, with the radial tapped hole 59C in threaded engagement with the screw rod 58. At the other longitudinal end of the displacement member 59, the shaft portion 59A is rotatably fitted in the sleeve 26 which is attached on the side panel 25 of the floor panel 21, and a bolt 60 is threaded into the bolt hole 59D to prevent dislodgement of the displacement member 59 from the sleeve 26.

With the tilting mechanism 54 which is arranged in the manner as described above, upon rotationally driving the screw rod 58, for example, by an impact wrench which is connected to the tool connecting portion 58C at the projected fore end of the screw rod 58, the displacement member 59 which is in threaded engagement with the screw rod 58 is translated on and along the guide rail assembly 57 in the direction of arrow C. As a consequence, the displacement member 59 of the tilting mechanism 54 is moved away from and put at a greater distance from the support member 12, tilting the floor panel 21 which is connected with the displacement member 59 forward or upward in the direction of arrow A (a tilt-up) by turning the floor panel 21 about supporting point on the floor panel support mechanisms 40 and 46.

On the other hand, if the screw rod 58 of the tilting mechanism 54 is driven in reverse direction, translating the displacement member 59 toward the fitting base end portion 57A along the guide rail assembly 57 (in the direction of arrow D) to minimize the distance between the displacement member 59 and the support member 12, the floor panel 21 is tilted rearward or downward in the direction of arrow B (a tilt-down), turning about supporting point on the floor panel support mechanisms 40 and 46.

In this instance, the thrust bearing 58B at the fore end of the screw rod 58 is fitted in the end connector 57C of the guide rail assembly 57, but the base end of the screw rod 58 is disposed as a free end 58A. Therefore, for example, in case the screw rod 58 is rotated in a distorted state, the free end 58A is put in oscillatory movements to reduce operational resistance by distortion.

Indicated at 61 is a counterweight which is attached to rear end of the revolving frame 5, behind the engine 6 as shown in FIG. 1, as a weight balance for the working mechanism 4. Further, indicated at 62 is an exterior cover which is provided around the canopy 31, more particularly, from rear to right side of the canopy 31.

Being arranged in the manner as described above, the hydraulic excavator 1 of the present embodiment is put in operation, for example, in the manner as follows.

In the first place, an operator gets onto the machine under the canopy 31 and takes the operator's seat 28. In this state, the operator handles or operates the vehicle control levers/pedals 30 to put the lower structure 2 in travel. If necessary, the working mechanism 4 can be put in a ground excavating operation by the working mechanism control levers 29.

For carrying out maintenance and service for the hydraulic excavator 1, more particularly, for the engine 6, hydraulic pump 7 and control valve 11 which are mounted under the floor panel 21, it becomes necessary to tilt up the floor panel 21 in the direction of arrow A together with the canopy 31 as shown in FIGS. 22 and 23.

Together with the operator's seat 28 and the canopy 31, the floor panel 21 is tilted up by the following procedure. Firstly, the housing mount plate 24 of the floor panel 21 is disconnected from the floor panel mount plate 19 on the side of the revolving frame 5, by removing the three fastening bolts 39 of FIG. 9 with the use of a spanner or other suitable tool. Since the head of each fastening bolt 39 is exposed on the base plate 37, a spanner can be easily brought into engagement with the bolt head, permitting to remove the fastening bolt in a facilitated manner.

The floor panel mount plate 19 on the side of the revolving frame 5 and the floor panel 21 are disconnected by removing the fastening bolts 39 in the manner as described above. In the next place, the screw rod 58 of the tilting mechanism 54 is rotationally driven by the use of an impact wrench, whereupon the displacement member 59 is translated toward the fore end of the guide rail assembly 57. As a result, the floor panel 21 and canopy 31, to which the displacement member 59 is attached, are tilted up in the direction of arrow A, turning about the supporting point on the floor panel support mechanisms 40 and 46 as shown in FIGS. 22 and 23.

When the floor panel 21 is in the tilted state, the front and upper sides of the engine 6 are mostly exposed to the outside as shown in FIGS. 22 and 23. Therefore, a maintenance service man can easily reach the equipments under the floor panel 21 for inspection, adjustments, repair or for replacement of the control valve 11.

Further, when the floor panel 21 is tilted up forward or upward together with the canopy 31, the abutting portion 53 on one of the mount plate 48 is brought into abutting engagement with the load support portion 52 on the bracket 47 on the side of the revolving frame, as shown in FIGS. 20 and 21. Accordingly, the range of tilting action of the floor panel 21 can be restricted to the predetermined angular range α shown in FIGS. 22 and 23.

Thus, by the load support portion 52 and the abutting portion 53 of the tilting stopper 51, the canopy 31 is prevented from falling into collision against the working mechanism 4 or other nearby equipments. In addition, when the floor panel 21 is tilted up largely in forward direction, a load on the side of the floor panel 21 is sustained by the load support portion 52 of the tilting stopper 51, preventing imposition of an overload on the tilting mechanism 54.

On the other hand, upon completion of a maintenance job, the screw rod 58 of the tilting mechanism 54 is rotated in reverse direction by the use of an impact wrench, for tilting down the floor panel 21 and the canopy 31 in the direction of arrow B. Then, the housing mount plate 24 of the floor panel 21 and the base plate 37 of the canopy 31 are fixedly fastened to the floor panel mount plate 19 by the use of the fastening bolts 39 at the end of a maintenance job.

Thus, according to the present embodiment, the floor panel mount plate 19 is provided on the support member 12 on the rear side of the revolving frame 5, and the vibration insulators 20 are interposed between the floor panel mount plate 19 and the support member 12. To the floor panel mount plate 19, the housing mount plate 24 of the floor panel 21 and the base plate 37 of the canopy 31 are detachably fastened together by the use of the fastening bolts 39.

Accordingly, prior to tilting up the floor panel 21 together with the operator's seat 28 and the canopy 31, the housing mount plate 24 of the floor panel 21 is disconnected from the floor panel mount plate 19 on the side of the revolving frame by removing the fastening bolts 39. Then, by way of the tilting mechanism 54, the floor panel 21 can be tilted up along with the canopy 31, turning about a supporting point of the floor panel support mechanisms 40 and 46.

Thus, it suffices to remove the fastening bolts 39 at the time of tilting up the floor panel 21. Namely, there is no need for disassembling the vibration insulators 20 as in the prior art apparatus. This means that the floor panel 21 can be tilted up in a facilitated manner, permitting to carry out maintenance and service efficiently.

Besides, when the housing mount plate 24 of the floor panel 21 is fixed to the floor panel mount plate 19 by the fastening bolts 39, vibration of the floor panel 21 is damped by the vibration insulators 20 which are interposed between the floor panel mount plate 19 and the support member 12 to improve the operator's working environment.

Further, by the three fastening bolts 39, the housing mount plate 24 of the floor panel 21 is fastened to the floor panel mount plate 19 together with the base plate 37 of the canopy 31. As a consequence, the base plate 37 (the rear side) of the canopy 31 is mounted on the housing mount plate 24 by five bolts 38 and 39 in total, including the two mount bolts 38 for the housing mount plate 24, to increase the strength of the assembly.

Further, the vibration insulators 20 are attached to the lower side of the floor panel mount plate 19. Therefore, the vibration insulators 20 can be concealed under the floor panel mount plate 19. That is to say, the vibration insulators 20 can be kept under protection by the floor panel mount plate 19 and can be concealed under the floor panel mount plate 19 for the sake of simplicity in appearance. Besides, the heads of the fastening bolts 39 are exposed on the base plate 37 of the canopy 31, the fastening bolts 39 can be tightened or loosened easily from outside.

On the other hand, the tilting stopper 51, which restricts tilting action of the floor panel 21, is constituted by the load support portion 52 which is provided on the bracket 47 of the right floor panel support mechanism 46, and the abutting portion 53 which is integrally formed on one of the mount plates 48.

Therefore, as the floor panel 21 is tilted together with the operator's seat 28 and the canopy 31, turning about the supporting point on the floor panel support mechanisms 40 and 46, the tilting action of the floor panel 21 is restricted to a predetermined angular position a by the tilting stopper 51. Thus, the tilting stopper 51 can prevent the canopy 31 from getting damages by falling forward largely together with the floor panel 21, contributing to improve the reliability of the hydraulic excavator 1.

In addition, when the floor panel 21 is tilted to a large extent, the load resulting from the tilting can be supported by the tilting stopper 51, preventing overloading of the tilting mechanism 54 which is in a floor panel tilting operation. Thus, the tilting stopper 51 can contribute to improve durability and prolong service life of the tilting mechanism 54.

Furthermore, the tilting stopper 51 which is constituted by the load support portion 52, which is provided on the bracket 47 of the right floor panel support mechanism 46, and the abutting portion 53 on the side of the mount plate 48, so that the tilting stopper 51 can be formed in a compact form by the use of the right floor panel support mechanism 46, contributing to improve efficiency in an assembling stage.

Moreover, the load support portion 52 of the tilting stopper 51 is formed as a fixed projection on the bracket 47 on the side of the frame. Therefore, the load support portion 52 can be easily formed integrally with the bracket 47 in a casting stage. Further, the load support portion 52 can function as a reinforcing rib which contributes to enhance the rigidity of the bracket 47. On the other hand, the abutting portion 53, a movable projection which is provided on fore end of the mount plates 48, can also be formed very easily.

Furthermore, vibrations which are transmitted from the revolving frame 5 to the floor panel 21 are damped by the vibration insulating rubbers 43 and 49 which are provided on the floor panel support mechanisms 40 and 46 to maintain more comfortable working environment for the operator taken to the operator's seat 28.

Figure 24:
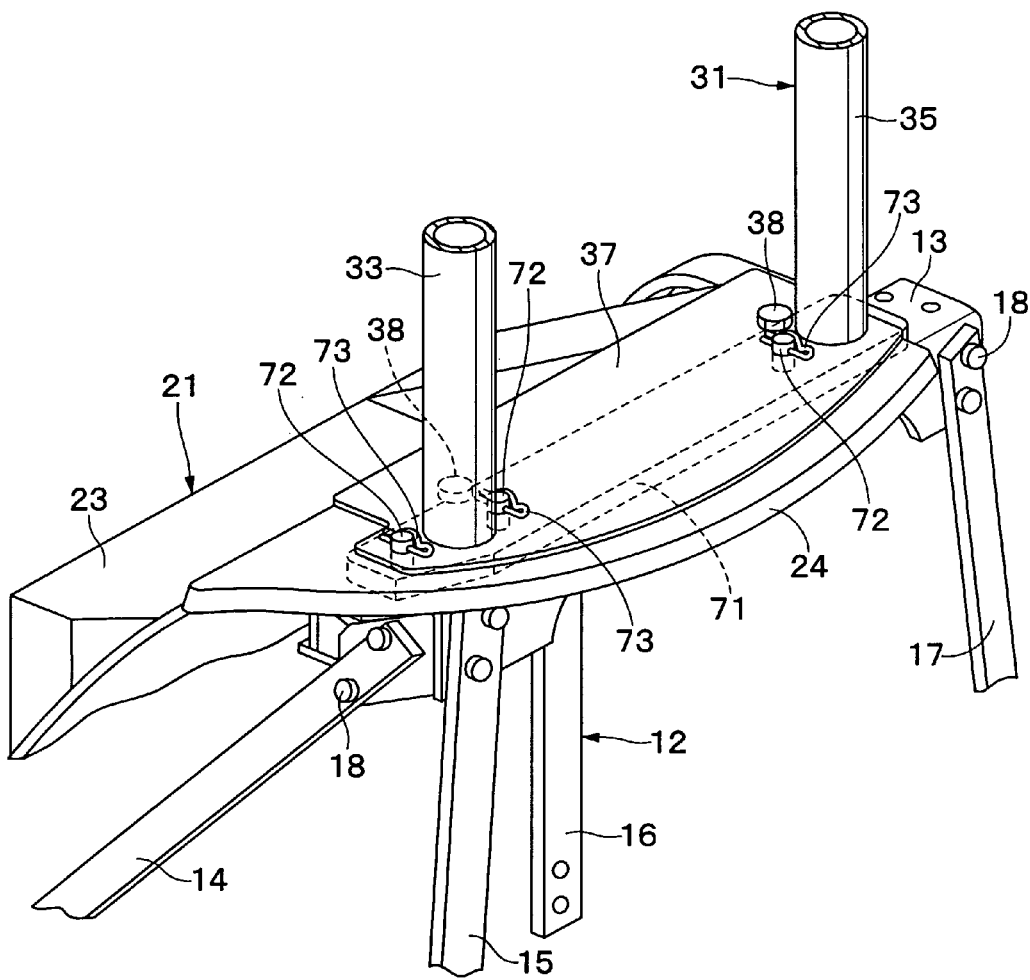
FIG. 24 is a perspective view, showing a floor panel mount plate, support pins adopted in a second embodiment of the invention, shown together with the support member, floor panel and canopy.

Now, turning to FIG. 24, there is shown a second embodiment of the present invention. In the following description of the second embodiment, those component parts which are identical with the counterparts in the foregoing first embodiment are simply designated by the same reference numerals or characters to avoid repetitions of same explanations.

In short, the present embodiment has features in that three support pins 72 are fixedly provided on a floor panel mount plate 71, and a stopper pin 73 is provided at an upper (fore) end of each support pin 72 thereby to fix the housing mount plate 24 of the floor panel 21 to the floor panel mount plate 71 together with the base plate 37 of the canopy 31.

In this instance, the floor panel mount plate 71 is arranged approximately in the same way as the floor panel mount plate 19 in the foregoing first embodiment. However, the floor panel mount plate 71 differs from the counterpart in the first embodiment that the support pins 72 are fixed at the respective lower ends. Along with the stopper pins 73, these support pins 72 constitute fastening members.

At the time of tilting up the floor panel 21 together with the canopy 31, the stopper pins 73 are removed from the upper ends of the support pins 72 to free the floor panel 21 (the housing mount plate 24) from the floor panel mount plate 71 on the side of the support member 12.

Being arranged as described above, the present embodiment can produce substantially the same operational effects as the foregoing first embodiment. In this case, the support pins 72 and stopper pins 73 are adopted as fastening members for fixing the housing mount plate 24 of the floor panel 21 to the floor panel mount plate 71 on the side of the support member 12.

In the above-described second embodiment, by way of example the support pins 72 and stopper pins 73 are employed as fastening members for detachably fixing the housing mount plate 24 of the floor panel 21 to the floor panel mount plate 71. However, in this regard, the present invention is not limited to the particular examples shown. For instance, a nut may be employed as a stopper member and threaded onto a male screw which is tapped at and around an upper end of each one of the support pins 72 as shown in FIG. 24.

Further, in the first embodiment, the housing mount plate 24 of the floor panel 21 is fixed to the floor panel mount plate 19 by the use of three fastening bolts 39. However, the present invention is not limited to this particular example. Namely, the housing mount plate 24 of the floor panel 21 may be fixed to the floor panel mount plate 19 by the use of two or more than four fastening bolts 39.

Figure 25:
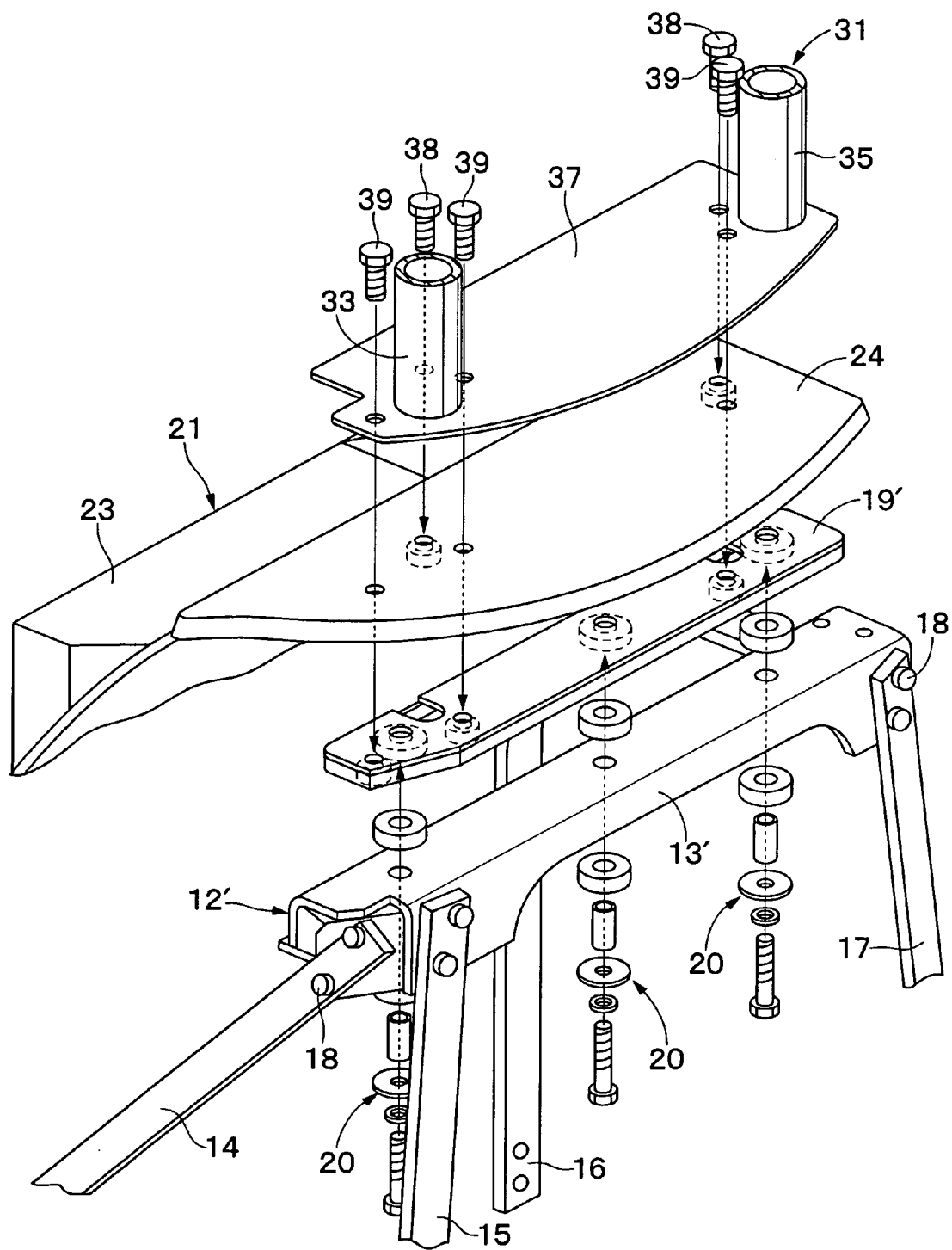
FIG. 25 is an exploded perspective view of support member, vibration insulators and floor panel mount plate adopted in a first modification of the invention, shown together with housing mount plate of the floor panel, base plate portion of a canopy and fastening bolts.
Figure 26:
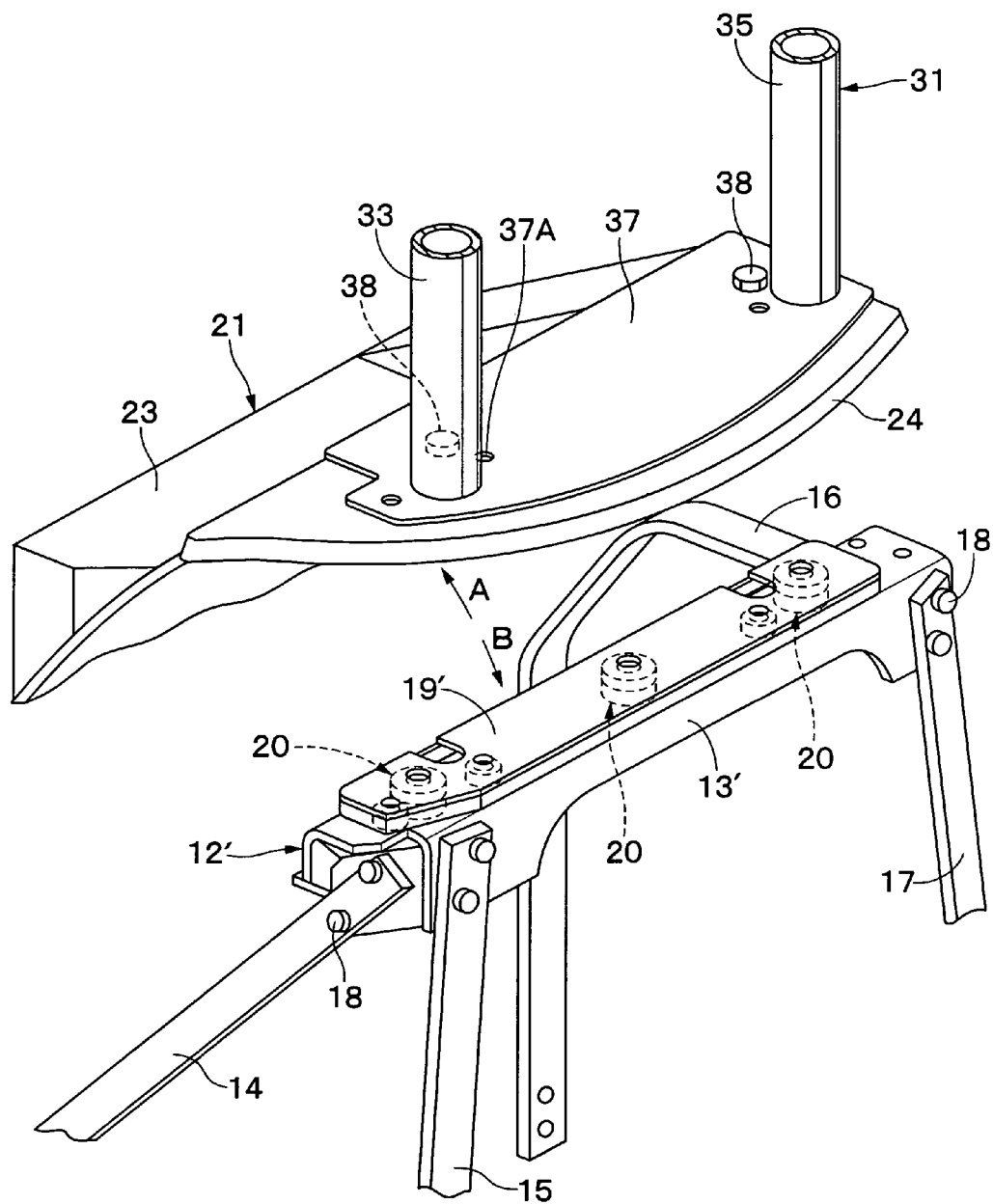
FIG. 26 is an enlarged perspective view, taken from the same position as FIG. 25, of rear side positions of the floor panel and canopy which have been tilted up after removing fastening bolts.

Further, in the first embodiment, by way of example a total of two vibration insulators 20 are provided between the support base 13 and the floor panel mount plate 19 of the support member 12. However, the present invention is not limited to this particular example. For instance, the three vibration insulators 20 in total may be provided between the support base 13' of the support member 12' and the floor panel mount plate 19' as exemplified in a first modification shown in FIGS. 25 and 26.

Furthermore, in the first embodiment, by way of example the tilting stopper 51 is provided on the right floor panel support mechanism 46. However, needless to say, the present invention is not limited to this particular arrangement. For example, the tilting stopper may be provided at a transversely intermediate position of the floor panel 21.

Figure 27:
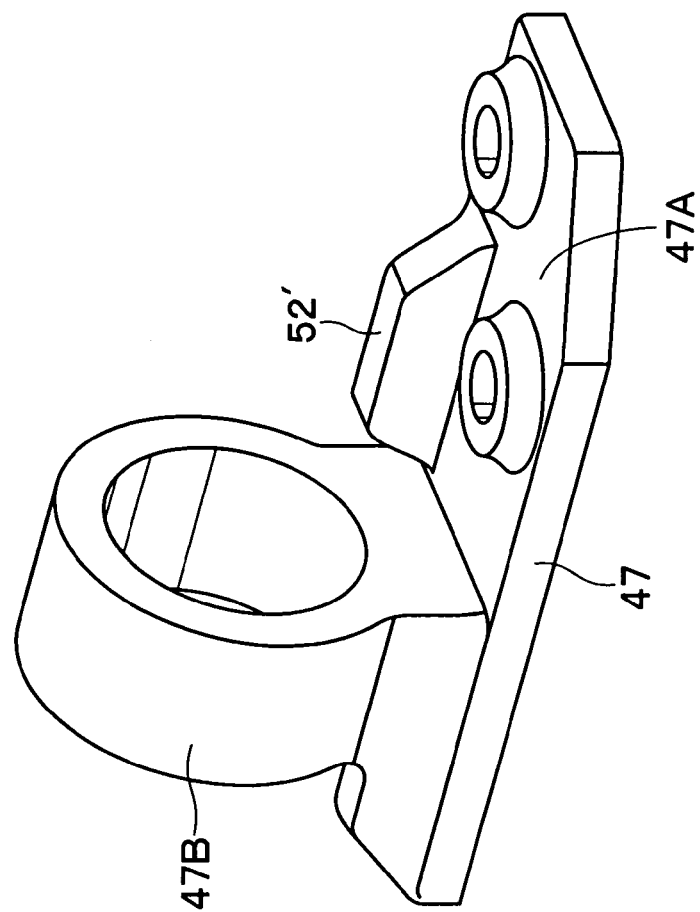
FIG. 27 is a perspective view of a bracket on the side of the frame in a second modification of the invention, the bracket having a load support portion of the tilting stopper.

On the other hand, in the first embodiment, by way of example the load support portion 52 of the tilting stopper 51 is provided between the mount stand 47A and the tubular support member 47B of the bracket 47 on the side of the frame. However, the present invention is not limited to this particular arrangement. For example, as shown in a second modification of FIG. 27, a load support portion 52' may be projected on the mount stand 47A at a position spaced from the tubular support member 47B.

Moreover, in the foregoing embodiments, by way of example the brackets 41 and 47 are provided on the side of the revolving frame 5, while the mount plates 42 and 48 as a bracket on the side of the floor panel are provided on the side of the floor panel 21. However, the present invention is not limited to this arrangement. For example, if desired, the mount plates 42 and 48 may be provided on the side of the revolving frame 5, and brackets similar to the brackets 41 and 47 may be provided on the side of the floor panel 21.

Further, in the foregoing embodiments, by way of example the tilting stopper 51 is provided on the right floor panel support mechanism 46. However, in this regard, the present invention is not limited to this particular arrangements shown. If desired, the tilting stopper 51 may be provided on the left floor panel support mechanism 40. Otherwise, the tilting stopper 51 may be provided on both of the right and left floor panel support mechanisms 40 and 46.

On the other hand, in the foregoing embodiments, the floor panel tilting mechanism 54 is arranged to tilt up or down the floor panel 21 to a degree commensurate with a distance of translation of the displacement member 59 which is translated on and along the guide rail assembly 57 by rotation of the screw rod 58. However, in this regard, the present invention is not limited to the particular arrangements shown. For example, the floor panel 21 may be tilted by the use of other tilting mechanism using gas dampers or the like. Otherwise, it is also possible to connect the canopy 31 with the working mechanism 4 and to tilt up the floor panel 21 by a derricking motion of the working mechanism 4.

Figure 28:
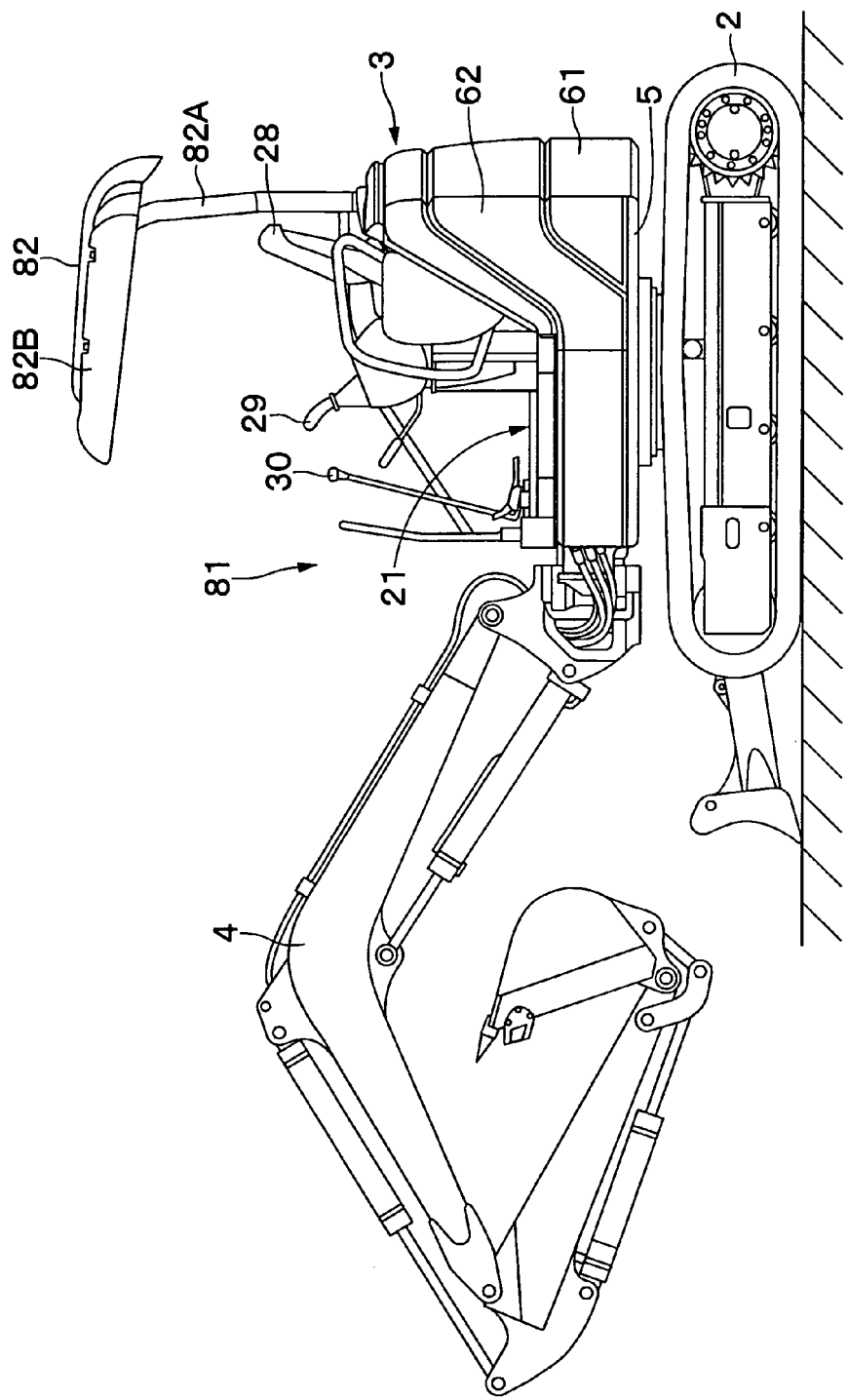
FIG. 28 is a front view of a canopy type hydraulic excavator in a third modification of the invention.

Moreover, in the foregoing embodiments, by way of example the present invention is applied to a canopy type hydraulic excavator 1 with four-post canopy 31 having four posts 32 to 35 on the floor panel 21 of the construction machine. However, in this regard, the present invention is not limited to the particular arrangements shown. For example, the present invention can be applied to a hydraulic excavator 81, with a two-post canopy 82 having a roof portion 82B supported on two rear posts 82A (one of which is shown in the drawing) as shown as a third modification in FIG. 28.

Furthermore, the present invention can also be applied to a hydraulic excavator which is furnished with a cab around an operator's seat, or to a hydraulic excavator with an operator's seat simply mounted on a floor panel without a canopy or cab. Further, the present invention can find applications in other construction machines with a floor panel and an operator's seat.

The invention claimed is:

1. A construction machine having a frame supporting a working mechanism on the front side thereof, a floor panel provided on said frame and pivotally supported at a fore end thereof through a supporting point, and an operator's seat provided on said floor panel and to be taken by an operator, characterized in that said construction machine comprises:

a support member located in a rear side of said frame to support a rear side portion of said floor panel;

a floor panel mount plate located on top of said support member for mounting thereon a rear side portion of said floor panel;

vibration insulators interposed between said floor panel mount plate and said support member to dampen vibrations to be transmitted to said floor panel mount plate from said frame through said support member;

fastening members detachably mounted at a rear side portion of said floor panel to said floor panel mount plate;

said support member includes a support base located over said frame to support said floor panel mount plate thereon, and a plural number of support posts each fixed to said frame to support said support base from beneath; and each one of said vibration insulators being composed of upper and lower resilient members adapted to hold said support base from upper and lower sides, and bolts adapted to connect said floor panel mount plate to said support base through said resilient members.

2. A construction machine as defined in claim 1, further comprising a housing on said floor panel, said housing being arranged to cover said operator's seat at least at an overhead position and provided with a base plate in a rear side portion to be attached to a rear side of said floor panel.

3. A construction machine as defined in claim 2, wherein said fastening members are adapted to fasten said base plate of said housing to said floor panel mount plate together with a rear side portion of said floor panel.

4. A construction machine as defined in claim 1, wherein said fastening members are each in the form of a bolt with a male screw, and said floor panel mount plate is provided with vibration insulator mount portions adapted to mount said vibration insulators from beneath, and female screw provided at different positions from said vibration insulator mount portions and said bolt being threaded into said female screw from above said floor panel mount plate.

5. A construction machine as defined in claim 1, further comprising a tilting stopper between said frame and said floor panel to restrict a tilting action of said floor panel to a predetermined angular position when said floor panel is tilted along with said operator's seat.

6. A construction machine as defined in claim 1, further comprising a floor panel support mechanism located between fore ends of said frame and said floor panel, and connected to fore end of said floor panel through a support point in tilting up and down along with said operator's seat; and a tilting stopper provided on said floor panel support mechanism to restrict a tilting action of said floor panel to a predetermined angular position when said floor panel is tilted forward by way of using said floor panel support mechanism as a supporting point.

7. A construction machine as defined in claim 6, wherein said floor panel support mechanism is comprised of a first bracket provided on the side of said frame, a second bracket provided on the side of said floor panel, and a joint pin pivotally connecting said first and second brackets; and said tilting stopper is comprised of a load support portion provided on one of said first and second brackets, and an abutting portion provided on the other one of said first and second brackets and brought into abutment against said load support portion when said floor panel has been tilted to a predetermined angular position.

8. A construction machine as defined in claim 7, wherein one of said first and second brackets is comprised of a mount stand fixed on one of said frame and said floor panel, and a tubular support member provided on said mount stand to have an axis thereof in a transverse direction; and the other one of said first and second brackets is comprised of a pair of mount plates adapted to support opposite end portions of said joint pin passed through said tubular support member;

said load support portion of said tilting stopper being constituted by a fixed projection formed on a mount stand of one of said first and second brackets; and said abutting portion being constituted by a movable projection formed at a fore end of on one of said mount plates and moved along with said floor panel toward said fixed projection when said floor panel is tilted.

9. A construction machine as defined in claim 1, further comprising a floor panel support mechanism located between fore ends of said frame and said floor panel, and connected to a fore end of said floor panel through a support point for tilting up and down along with said operator's seat;

a tilting mechanism provided between said frame and said floor panel on the rear side of said floor panel support mechanism, said tilting mechanism being adapted to tilt up and down said floor panel by way of a pivoting point provided on the side of said frame and a displacement point provided on the side of said floor panel and translated to an arbitrary position, tilting up said floor panel in forward or upward direction to a degree commensurate with distance of translation of said displacement point.

10. A construction machine having a frame supporting a working mechanism on the front side thereof, a floor panel provided on said frame and pivotally supported at a fore end thereof through a supporting point, and an operator's seat provided on said floor panel and to be taken by an operator, characterized in that said construction machine comprises:

a support member located in a rear side of said frame to support a rear side portion of said floor panel;

a floor panel mount plate located on top of said support member for mounting thereon a rear side portion of said floor panel;

vibration insulators interposed between said floor panel mount plate and said support member to dampen vibrations to be transmitted to said floor panel mount plate from said frame through said support member;

fastening members detachably mounted at a rear side portion of said floor panel to said floor panel mount plate;

a floor panel support mechanism located between fore ends of said frame and said floor panel, and connected to a fore end of said floor panel through a support point for tilting up and down along with said operator's seat; and a tilting mechanism provided between said frame and said floor panel on the rear side of said floor panel support mechanism, said tilting mechanism being adapted to tilt up and down said floor panel by way of a pivoting point provided on the side of said frame and a displacement point provided on the side of said floor panel and translated to an arbitrary position, tilting up said floor panel in forward or upward direction to a degree commensurate with distance of translation of said displacement point, wherein said tilting mechanism comprises a guide rail assembly having a pivoting point at base end thereof pivotally supported on the side of said frame for upward and downward pivoting movements and having a fore end extended forward in a free state, a screw rod extended along and in longitudinal direction of said guide rail assembly and rotatably supported on said guide rail assembly, and a displacement member rotatably mounted on the side of said floor panel and held in threaded engagement with said screw rod as a displacement point for movement in forward and rearward directions along said guide rail assembly.

* * * * *